(12) United States Patent
Sekiguchi et al.

(10) Patent No.: US 11,315,425 B2
(45) Date of Patent: Apr. 26, 2022

(54) HISTORY INFORMATION STORAGE APPARATUS, ROUTE CALCULATION METHOD, AND INFLUENCE RANGE DISTRIBUTION SYSTEM

(71) Applicant: CLARION CO., LTD., Saitama (JP)

(72) Inventors: Takaaki Sekiguchi, Tokyo (JP); Arata Hayashi, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/975,062

(22) PCT Filed: Dec. 13, 2018

(86) PCT No.: PCT/JP2018/045955
§ 371 (c)(1),
(2) Date: Aug. 21, 2020

(87) PCT Pub. No.: WO2019/163268
PCT Pub. Date: Aug. 29, 2019

(65) Prior Publication Data
US 2020/0402400 A1    Dec. 24, 2020

(30) Foreign Application Priority Data

Feb. 23, 2018 (JP) .............................. JP2018-030771

(51) Int. Cl.
*G08G 1/123* (2006.01)
*G08G 1/0968* (2006.01)
*G08G 1/0969* (2006.01)

(52) U.S. Cl.
CPC ..... *G08G 1/096888* (2013.01); *G08G 1/0969* (2013.01); *G08G 1/096833* (2013.01)

(58) Field of Classification Search
CPC ....... G08G 1/096888; G08G 1/096833; G08G 1/0969
(Continued)

(56) References Cited

U.S. PATENT DOCUMENTS

2006/0276962 A1    12/2006  Yoshioka et al.
2006/0293845 A1*   12/2006  Watanabe .............. G01C 21/32
                                                  701/450
(Continued)

FOREIGN PATENT DOCUMENTS

EP         1 890 108 A1    2/2008
JP         3884473 B2      11/2006
(Continued)

OTHER PUBLICATIONS

English Translation for KR20070091473A (Year: 2021).*
(Continued)

*Primary Examiner* — Mahmoud S Ismail
(74) *Attorney, Agent, or Firm* — Lewis Roca Rothgerber Christie LLP

(57) ABSTRACT

A history information storage apparatus includes: a storage unit that stores history information about a travel history of a vehicle and map data divided into a plurality of sections; a change detection unit that detects a change of the map data; an influence range determination unit that determines a section influenced by the change as an influenced section from among the plurality of sections; a history information control unit that temporarily invalidates the history information about the influenced section; and a navigation unit that calculates a route from a departure place to a destination in consideration of the history information and records, in the history information, a history of a travel of the vehicle which has strayed from the route.

9 Claims, 24 Drawing Sheets

(58) Field of Classification Search
USPC .......................................................... 701/532
See application file for complete search history.

(56) References Cited

U.S. PATENT DOCUMENTS

| | | | |
|---|---|---|---|
| 2007/0198184 A1* | 8/2007 | Yoshioka | G09B 29/106 |
| | | | 701/426 |
| 2014/0058672 A1 | 2/2014 | Wansley et al. | |
| 2018/0216957 A1* | 8/2018 | Bekkerman | G01C 21/26 |

FOREIGN PATENT DOCUMENTS

| | | | | |
|---|---|---|---|---|
| JP | 2012-63160 A | | | 3/2012 |
| JP | 2012063160 A | * | | 3/2012 |
| JP | 2017-73117 A | | | 4/2017 |
| KR | 20070091473 A | * | | 9/2007 |

OTHER PUBLICATIONS

English Translation for JP2012063160A (Year: 2021).*
International Search Report corresponding to PCT/JP2018/045955, dated Mar. 5, 2019, with English translation, 9 pages.
Extended European Search Report dated Oct. 13, 2021 for corresponding European Application No. 18907277.0 (7 pages).
Japanese Office Action dated Nov. 2, 2021 regarding Japanese Patent Application No. 2018-030771 corresponding to U.S. Appl. No. 16/975,062 (3 pages) with English Machine Translation (3 pages).

* cited by examiner

FIG.4

| SECTION ID | LINK ID | STARTING POINT COORDINATES (X_S',Y_S') | ENDING POINT COORDINATES (X_E',Y_E') | ROAD TYPE A' | COST C' | NOTE |
|---|---|---|---|---|---|---|
| T11 | L1 | (40, 0) | (80, 55) | 2 | 2 | NEWLY BUILT |
| T11 | L2 | (80, 55) | (100, 75) | 2 | 2 | NEWLY BUILT |
| T11 | L3 | (80, 55) | (50, 60) | 4 | 10 | NEWLY BUILT |
| T11 | L4 | (0, 30) | (40, 50) | 2 | 6 | OLD L1 |
| T11 | L5 | (40, 50) | (50, 60) | 2 | 3 | OLD L2 |
| T11 | L6 | (50, 60) | (80, 100) | 2 | 3 | OLD L2 |
| T11 | L7 | (40, 50) | (42, 100) | 3 | 9 | OLD L3 |
| T12 | L1 | (80, 0) | (100, 25) | 2 | 6 | NO CHANGE |
| T12 | L2 | (42, 0) | (44, 48) | 3 | 9 | NO CHANGE |
| T12 | L3 | (44, 48) | (65, 100) | 3 | 9 | NO CHANGE |
| T13 | L1 | (65, 0) | (100, 40) | 3 | 9 | NO CHANGE |
| T21 | L1 | (0, 75) | (30, 100) | 2 | 2 | NEWLY BUILT |
| T22 | L1 | (30, 0) | (100, 40) | 2 | 2 | NEWLY BUILT |
| T22 | L2 | (0, 25) | (40, 50) | 2 | 6 | OLD L1 |
| T22 | L3 | (40, 50) | (100, 85) | 2 | 6 | OLD L2 |
| T23 | L1 | (0, 40) | (55, 50) | 3 | 9 | NO CHANGE |
| T23 | L2 | (55, 50) | (100, 48) | 3 | 9 | NO CHANGE |
| T32 | L1 | (0, 40) | (60, 100) | 2 | 3 | NEWLY BUILT |
| T32 | L2 | (0, 85) | (30, 100) | 2 | 6 | OLD L1 |
| T33 | L1 | (60, 0) | (70, 45) | 2 | 2 | NEWLY BUILT |
| T33 | L2 | (70, 45) | (90, 100) | 2 | 2 | NEWLY BUILT |
| T33 | L3 | (70, 45) | (50, 70) | 4 | 10 | NEWLY BUILT |
| T33 | L4 | (30, 0) | (45, 30) | 2 | 6 | OLD L1 |
| T33 | L5 | (45, 30) | (50, 70) | 2 | 3 | OLD L2 |
| T33 | L6 | (50, 70) | (60, 100) | 2 | 3 | OLD L2 |
| T33 | L7 | (0, 48) | (20, 40) | 3 | 9 | OLD L3 |
| T33 | L8 | (20, 40) | (45, 30) | 3 | 9 | OLD L4 |
| T33 | L9 | (20, 40) | (30, 100) | 5 | 20 | OLD L5 |
| ⋮ | ⋮ | ⋮ | ⋮ | ⋮ | ⋮ | ⋮ |

| SECTION ID | HISTORY LINK ID | ROAD TYPE | THE NUMBER OF TRAVELS | WITHHOLDING FACTOR | EXPIRATION DATE |
|---|---|---|---|---|---|
| T11 | L3 | 3 | 5 | — | — |
| T33 | L5 | 5 | 5 | — | — |
| : | : | | : | : | |

(b)

| SECTION ID | HISTORY LINK ID | ROAD TYPE | THE NUMBER OF TRAVELS | WITHHOLDING FACTOR | EXPIRATION DATE |
|---|---|---|---|---|---|
| T11 | L7 | 3 | 5 | ROAD NEWLY BUILT | 2017/10/1 |
| T33 | L9 | 5 | 5 | — | — |
| : | : | | : | : | |

FIG.6

CHANGE CONTENT OF SECTION T11

| UPDATED LINK ID | CORRESPONDING LINK ID | CHANGE |
|---|---|---|
| L1 | – | NEWLY BUILT |
| L2 | – | NEWLY BUILT |
| L3 | – | NEWLY BUILT |
| L4 | L1 | NONE |
| L5 | L2 | COST CHANGE |
| L6 | L2 (DIVISION) | COST CHANGE |
| L7 | L3 | NONE |

CHANGE CONTENT OF SECTION T33

| UPDATED LINK ID | CORRESPONDING LINK ID | CHANGE |
|---|---|---|
| L1 | – | NEWLY BUILT |
| L2 | – | NEWLY BUILT |
| L3 | – | NEWLY BUILT |
| L4 | L1 | NONE |
| L5 | L2 | COST CHANGE |
| L6 | L2 (DIVISION) | COST CHANGE |
| L7 | L3 | NONE |
| L8 | L4 | NONE |
| L9 | L5 | NONE |

FIG.9
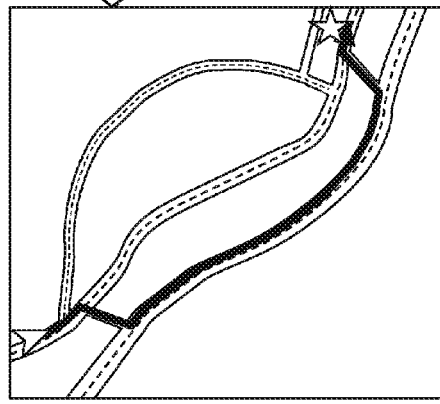
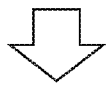
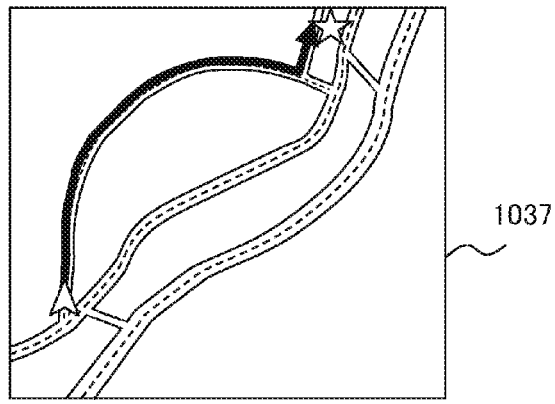

FIG.13

| UPDATED LINK ID (911) | CURRENT LINK ID (912) | STARTING POINT DIFFERENCE (913) | ENDING POINT DIFFERENCE (914) | TYPE DIFFERENCE (915) | COST DIFFERENCE (916) |
|---|---|---|---|---|---|
| L1 | L1 | 50.00 | 40.31 | 0 | 4 |
|    | L2 | 50.00 | 45.00 | 0 | 4 |
|    | L3 | 50.00 | 58.90 | 1 | 7 |
| L2 | L1 | 83.82 | 65.00 | 0 | 4 |
|    | L2 | 40.31 | 32.02 | 0 | 4 |
|    | L3 | 40.31 | 63.16 | 1 | 7 |
| L3 | L1 | 83.82 | 14.14 | 2 | 4 |
|    | L2 | 40.31 | 50.00 | 2 | 4 |
|    | L3 | 40.31 | 40.79 | 1 | 1 |
| L4 | L1 | 0.00 | 0.00 | 0 | 0 |
|    | L2 | 44.72 | 64.03 | 0 | 0 |
|    | L3 | 44.72 | 50.04 | 1 | 3 |
| L5 | L1 | 44.72 | 14.14 | 0 | 3 |
|    | L2 | 0.00 | 50.00 | 0 | 3 |
|    | L3 | 0.00 | 40.79 | 1 | 6 |
| L6 | L1 | 58.31 | 64.03 | 0 | 3 |
|    | L2 | 14.14 | 0.00 | 0 | 3 |
|    | L3 | 14.14 | 38.00 | 1 | 6 |
| L7 | L1 | 44.72 | 50.04 | 1 | 3 |
|    | L2 | 0.00 | 38.00 | 1 | 3 |
|    | L3 | 0.00 | 0.00 | 0 | 0 |

(a)

| INFLUENCED SECTION ID | FACTOR |
|---|---|
| T13 | ROAD NEWLY BUILT |
| T23 | ROAD NEWLY BUILT |
| T22 | ROAD NEWLY BUILT |
| T32 | ROAD NEWLY BUILT |
| T31 | ROAD NEWLY BUILT |

(b)

(a)

| INFLUENCED SECTION ID | FACTOR |
|---|---|
| T11 | ROAD NEWLY BUILT |
| T12 | ROAD NEWLY BUILT |
| T13 | ROAD NEWLY BUILT |
| T21 | ROAD NEWLY BUILT |
| T22 | ROAD NEWLY BUILT |
| T23 | ROAD NEWLY BUILT |

| | 801 | 802 | 803 | 804 | 805 | 806 |
|---|---|---|---|---|---|---|
| | SECTION ID | LINK ID | STARTING POINT (X_S',Y_S') | ENDING POINT (X_E',Y_E') | ROAD TYPE A' | COST C' |
| | T11 | L1 | (0, 30) | (40, 50) | 2 | 6 |
| | T11 | L2 | (40, 50) | (80, 100) | 2 | 6 |
| | T11 | L3 | (40, 50) | (42, 100) | 3 | 9 |
| | T12 | L1 | (80, 0) | (100, 25) | 2 | 6 |
| | T12 | L2 | (42, 0) | (44, 48) | 3 | 9 |
| | T12 | L3 | (44, 48) | (65, 100) | 3 | 9 |
| | T13 | L1 | (65, 0) | (100, 40) | 3 | 9 |
| | T22 | L1 | (0, 25) | (40, 50) | 2 | 6 |
| | T22 | L2 | (40, 50) | (100, 85) | 2 | → 2 |
| | T23 | L1 | (0, 40) | (55, 50) | 3 | 9 |
| | T23 | L2 | (55, 50) | (100, 48) | 3 | 9 |
| | T32 | L1 | (0, 85) | (30, 100) | 2 | 6 |
| | T33 | L1 | (30, 0) | (45, 30) | 2 | 6 |
| | T33 | L2 | (45, 30) | (60, 100) | 2 | 6 |
| | T33 | L3 | (0, 48) | (20, 40) | 3 | 9 |
| | T33 | L4 | (20, 40) | (45, 30) | 3 | 9 |
| | T33 | L5 | (20, 40) | (30, 100) | 5 | 20 |
| | : | : | : | : | : | : |

FIG.24

CHANGE FACTOR OF SECTION T22 (920)

| UPDATED LINK ID (921) | CORRESPONDING LINK ID (922) | CHANGE (923) |
|---|---|---|
| L1 | L1 | NONE |
| L2 | L2 | COST CHANGE |

INFLUENCE RANGE (940)

| INFLUENCED SECTION ID (941) | FACTOR (942) |
|---|---|
| T11 | COST CHANGE |
| T12 | COST CHANGE |
| T22 | COST CHANGE |
| T32 | COST CHANGE |
| T33 | COST CHANGE |

HISTORY INFORMATION (900)

| SECTION ID (901) | HISTORY LINK ID (902) | ROAD TYPE (903) | THE NUMBER OF TRAVELS (904) | WITHHOLDING FACTOR (905) | EXPIRATION DATE (906) |
|---|---|---|---|---|---|
| T11 | L3 | 3 | 5 | COST CHANGE | 2017/10/1 |
| T33 | L5 | 5 | 5 | – | – |
| ⋮ | ⋮ | ⋮ | ⋮ | ⋮ | ⋮ |

HISTORY INFORMATION STORAGE APPARATUS, ROUTE CALCULATION METHOD, AND INFLUENCE RANGE DISTRIBUTION SYSTEM

CROSS-REFERENCE TO RELATED APPLICATION(S)

This application is a U.S. National Phase Patent Application and claims priority to and the benefit of International Application Number PCT/JP2018/045955, filed on Dec. 13, 2018, which claims priority of Japanese Patent Application Number 2018-030771, filed on Feb. 23, 2018, the entire contents of all of which are incorporated herein by reference.

TECHNICAL FIELD

The present invention relates to a history information storage apparatus, a route calculation method, and an influence range distribution system.

BACKGROUND ART

An in-vehicle apparatus for providing a driver with guide information by referring to map data is widely known. Also, regarding the in-vehicle apparatus, there is known a function that stores a travel history of a user, in addition to the map data, and utilizes it for guiding. For example, when a vehicle advances in a direction different from an advancing direction presented by the in-vehicle apparatus, this function is to learn a route preferred by the user by storing this history. Since history information is stored in association with ID's of links constituting the map data, a problem causing the history information to be no longer used occurs if the map data is updated and the ID's of the links are changed. Therefore, technology that makes it possible to use the history information despite the update of the map data has been devised.

PTL 1 discloses an event information storage apparatus which is mounted in a vehicle traveling on a road of map data while reading the map data and stores event information including at least either operations performed on the vehicle while traveling or behaviors of the vehicle by associating the event information with a vehicle position on the road, wherein the event information storage apparatus includes: a vehicle position acquisition unit that acquires the vehicle position; a road shape acquisition unit that acquires a shape of the road, on which the vehicle is running, from the map data; a feature position detection unit that detects a feature position of the road by extracting a shape feature by analyzing the shape of the road; an event information acquisition unit that acquires the event information; a vehicle position conversion unit that converts the vehicle position at a time point of acquisition of the event information into a relative position relative to the feature position; and an event information storage unit that stores the event information in association with the vehicle position converted into the relative position.

CITATION LIST

Patent Literature

PTL 1: Japanese Patent Application Laid-Open (Kokai) Publication No. 2017-73117

SUMMARY OF THE INVENTION

Problems to be Solved by the Invention

The invention described in PTL 1 cannot calculated a route designed according to the latest situation.

Means to Solve the Problems

A history information storage apparatus according to a first aspect of the present invention includes: a storage unit that stores history information about a travel history of a vehicle and map data divided into a plurality of sections; a change detection unit that detects a change of the map data; an influence range determination unit that determines a section influenced by the change as an influenced section from among the plurality of sections; a history information control unit that temporarily invalidates the history information about the influenced section; and a navigation unit that calculates a route from a departure place to a destination in consideration of the history information and records, in the history information, a history of a travel of the vehicle which has strayed from the route.

A route calculation method according to a second aspect of the present invention is a route calculation method executed by an arithmetic unit including a storage unit storing history information about a travel history of a vehicle and map data divided into a plurality of sections, wherein the route calculation method includes: detecting a change of the map data; determining a section influenced by the change as an influenced section from among the plurality of sections; temporarily invalidating the history information about the influenced section; and calculating a route from a departure place to a destination in consideration of the history information and recording, in the history information, a history of a travel of the vehicle which has strayed from the route.

An influence range distribution system according to a third aspect of the present invention is an influence range distribution system including a server and an in-vehicle apparatus that communicates with the server and is mounted in a vehicle, wherein the server includes: a server storage unit that stores map data divided into a plurality of sections; a change detection unit that detects a change of the map data; an influence range determination unit that determines a section influenced by the change as an influenced section from among the plurality of sections; and a server communication unit that transmits information of the influenced section determined by the influence range determination unit; and wherein the in-vehicle apparatus includes: a storage unit that stores history information about a travel history of the vehicle; an influence range receiving unit that receives the information of the influenced section determined by the influence range determination unit; a history information control unit that temporarily invalidates the history information about the influenced section; and a navigation unit that calculates a route from a departure place to a destination in consideration of the history information and records, in the history information, a history of a travel of the vehicle which has strayed from the route.

Advantageous Effects of the Invention

A route designed according to the latest situation can be calculated according to the present invention while maintaining the history information.

BRIEF DESCRIPTION OF DRAWINGS

FIG. 4 is a diagram illustrating actual data of the second map data 700 visualized in FIG. 2B;

FIG. 5 is a diagram illustrating an example of history information 900;

FIG. 6 is a diagram illustrating an example of change content 920;

FIG. 9 is a diagram illustrating images displayed on the display unit 103;

FIG. 13 is a diagram for explaining arithmetic processing illustrated in FIG. 12;

FIG. 21 is a diagram illustrating an example of third map data 800;

FIG. 24 is a diagram illustrating the change content 920, the influence range 940, and the history information 900 corresponding to the operating sequence.

DESCRIPTION OF EMBODIMENTS

First Embodiment

A first embodiment of a map update system S will be explained with reference to FIG. 1 to FIG. 17.

(Outline of Operations)

The map update system S according to the first embodiment includes an apparatus having a function that guides a user to a route preferred by the user by referring to history information. Then, when map data is updated, this apparatus can take over the history information and guide the user to a road which has been newly provided by the update. For example, even if the road would not be indicated to guide the user if the history information were taken over as it is, the user can be guided to such newly-provided road by means of contrivances described later.

(System Configuration)

Figure 1:
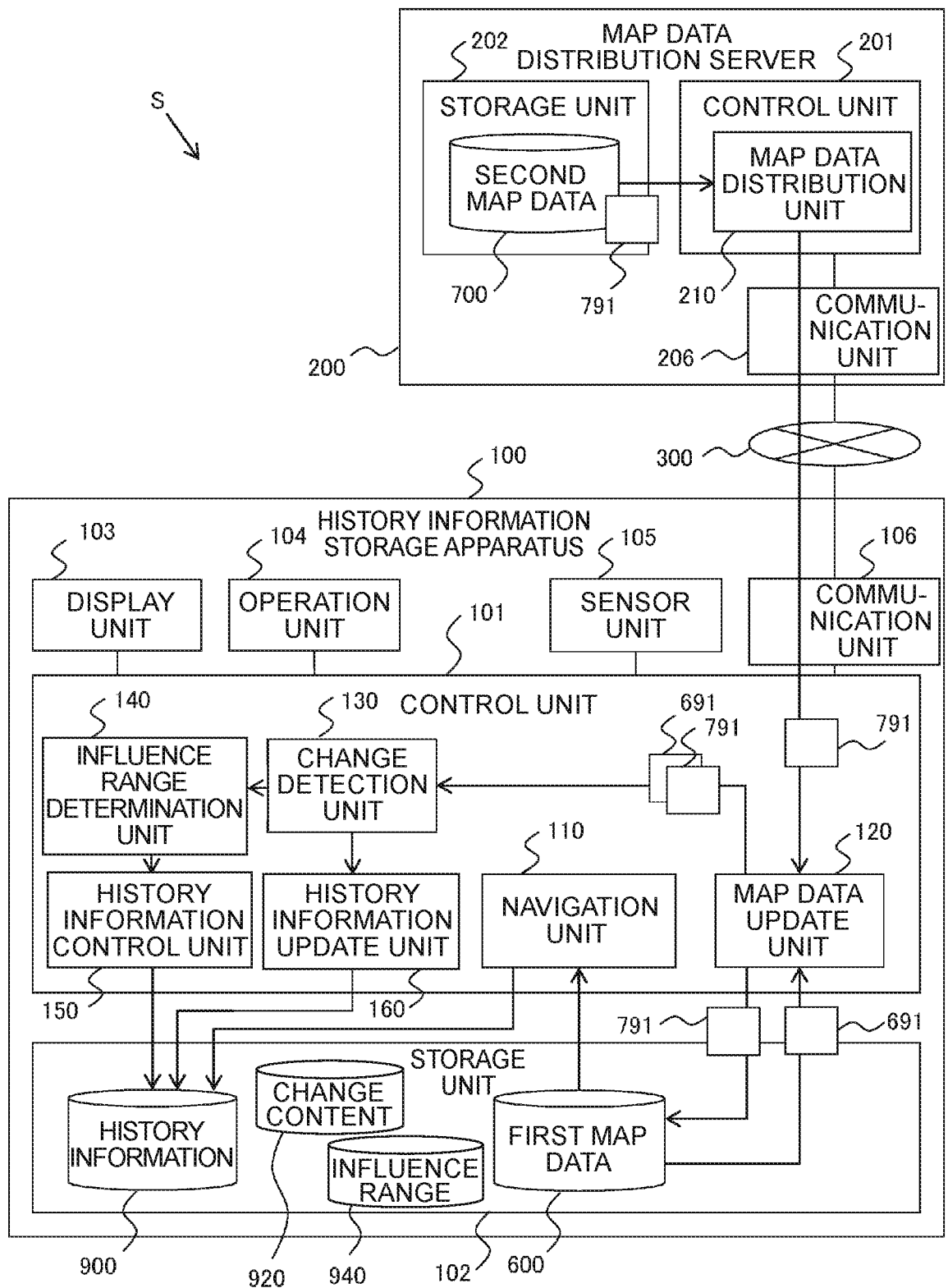
FIG. 1 is an overall configuration diagram of a map update system S according to a first embodiment.

FIG. 1 is an overall configuration diagram of the map update system S according to the first embodiment. The map update system S includes a history information storage apparatus 100 and a map data distribution server 200, which are connected to each other via a communication network 300. The history information storage apparatus 100 is a so-called car navigation apparatus and provides a passenger of a vehicle equipped with the history information storage apparatus 100 (hereinafter referred to as a "user") with navigation information.

The map data distribution server 200 includes: a control unit 201 that has a map data distribution unit 210 which executes a sequence of processing for distributing map data; a storage unit 202 that stores second map data 700; and a communication unit 206 for communicating with the history information storage apparatus 100. The second map data 700 is divided into sections, each of which has a specified size as described later, for example, $2 \times 2$ km$^2$ or $10 \times 10$ km$^2$, and information corresponding to each section will be referred to as "update data" 791.

The map data distribution unit 210 may be implemented as dedicated hardware or a software module executed by the control unit 201. Specifically, the map data distribution unit 210 may be implemented as an application specific integrated circuit (ASIC); and the map data distribution server 200 may include a CPU, a ROM, and a RAM and the function of the map data distribution unit 210 may be implemented by the CPU which is a central processing unit as by expanding a program, which is stored in the ROM, in the RAM and executing it.

The history information storage apparatus 100 includes: a control unit 101 that executes a sequence of processing as a car navigation apparatus; a storage unit 102 that stores first map data 600, change content 920, an influence range 940, and history information 900; a display unit 103 that displays a navigation screen; an operation unit 104 that performs various kinds of operations such as a route selection; a sensor unit 105 that acquires, for example, positional information; and a communication unit 106 that communicates with the map data distribution server 200. Incidentally, the change content 920 and the influence range 940 which are stored in the storage unit 102 are created and referenced during the process of arithmetic operation by the control unit 101 and temporarily exist in the storage unit 102.

The first map data 600 is divided into sections, each of which has a specified size in the same manner as the second map data 700, and information corresponding to each section will be referred to as "current data" 691. Furthermore, the first map data 600 and the second map data 700 are named as a matter of convenience so that whether the relevant information is new or old can be distinguished, and there is no structural difference between them. In this embodiment, map data stored in the history information storage apparatus 100 will be called the first map data 600 and the first map data 600 which is updated by using the second map data 700 will be called the "updated first map data 600."

The control unit 101 may be implemented as dedicated hardware or as a software module. Furthermore, the control unit 101 may be implemented as both hardware and a software module. The storage unit 102 is a nonvolatile storage apparatus such as a flash memory. The display unit 103 is, for example, a liquid crystal display. The operation unit 104 is, for example, a plurality of buttons. The sensor unit 105 is, for example, a GPS receiver and receives radio waves from a plurality of satellites, which constitute a satellite navigation system, and calculates the position of a driver's own vehicle, that is, the latitude and the longitude by analyzing a signal included in the radio waves.

The control unit 101 includes a navigation unit 110, a map data update unit 120, a change detection unit 130, an influence range determination unit 140, a history information control unit 150, and a history information update unit 160. The navigation unit 110 outputs a route calculation from a departure place to a destination in consideration of the history information 900 according to a known algorithm and guidance information based on the result of the route calculation to the display unit 103. The route calculation in consideration of the history information 900 is a route calculation adjusted to, for example, estimate a lower cost for links described in the history information 900 than a normal cost so as to increase the opportunity to pass through the links. Furthermore, since the history information 900 also describes the number of travels for each link as described later, it is designed so that a link with a larger number of travels tends to be easily included in the calculated route.

The map data update unit 120 updates the first map data 600. The change detection unit 130 detects a change of the map data by comparing the current data 691 included in the first map data 600 with a section 791 included in the second map data 700. The influence range determination unit 140 determines a range influenced by the change detected by the change detection unit 130. The history information control unit 150 controls handling of the history information within the influence range. The history information update unit 160 rewrites the ID's of links included in the history information 900 at the time of an update of the first map data 600 so as to indicate the same links before and after the update. Rewriting the ID's of the links to indicate the same links will be hereinafter also referred to as "succession."

(Visualization of Map Data)

Figure 2A:
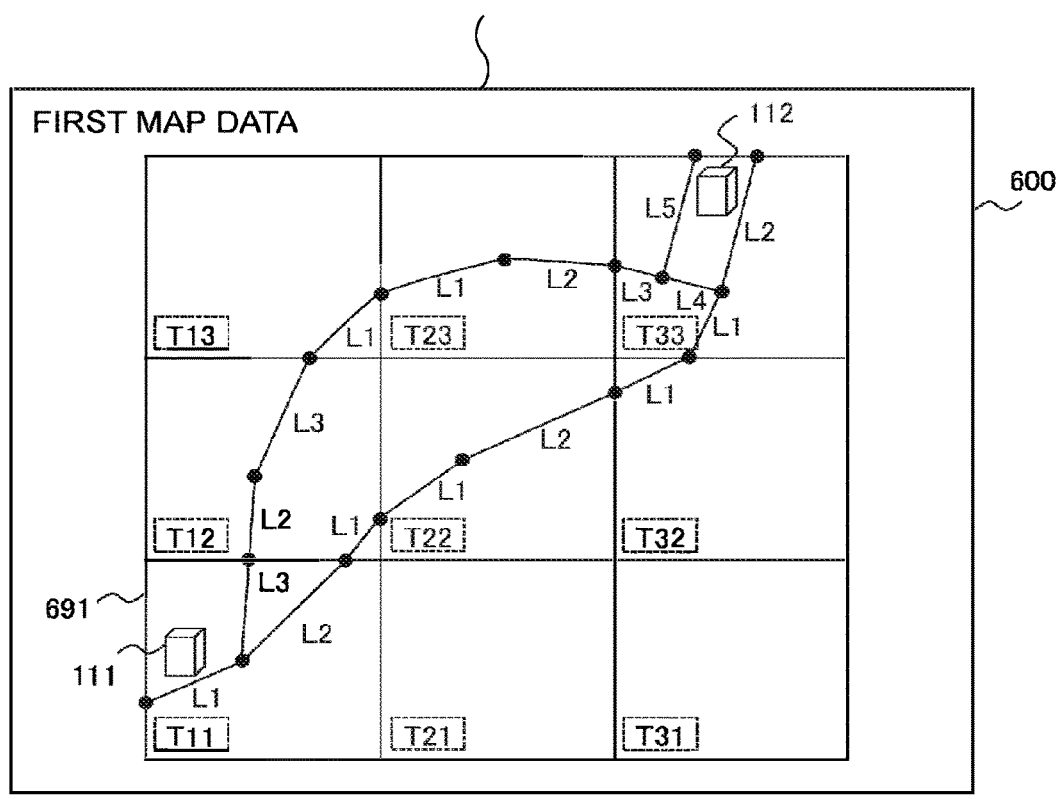
FIG. 2A is a diagram in which first map data 600 is visualized and FIG. 2B is a diagram in which second map data 700 is visualized.
Figure 2B:
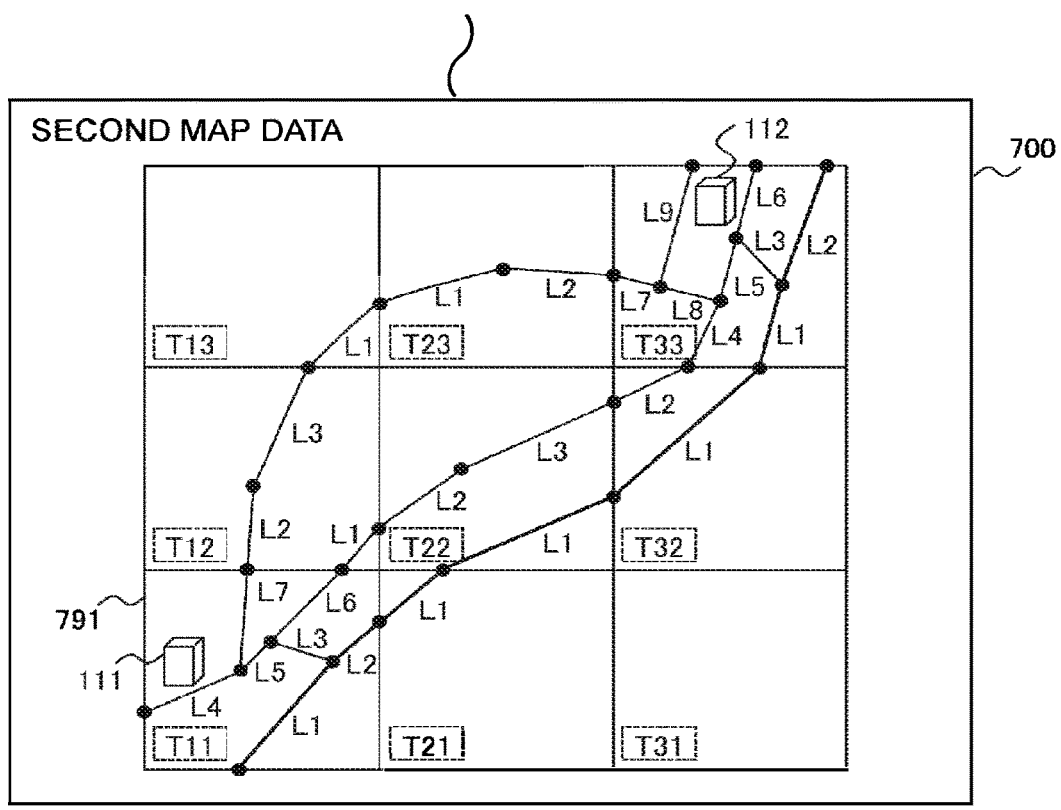

FIG. 2A is a diagram in which the first map data 600 is visualized; and FIG. 2B is a diagram in which the second map data 700 is visualized. Incidentally, FIG. 2A and FIG. 2B are illustrated as a matter of convenience to explain this embodiment below and images indicated in FIG. 2A and FIG. 2B are not stored as the first map data 600 or the second map data 700.

The first map data 600 and the second map data 700 are composed of a plurality of sections as mentioned earlier and are divided in the same manner. Each of FIG. 2A and FIG. 2B indicates nine sections including a section T11 indicated with the reference numeral 691, that is, sections T12, T13, T21, T22, T23, T31, T32, and T33 other than the section T11. For example, the section T11 in FIG. 2A and the section T11 in FIG. 2B indicate geographically the same area, for example, the area with the same latitude range and the same longitude range.

Referring to FIG. 2A and FIG. 2B, lines represent links which constitute roads and points represents nodes connecting the links. Signs such as L1 and L2 indicated near a link are numbers for identifying the relevant link (hereinafter referred as a "link ID") and each sign is a unique value within each section. The link ID is assigned in accordance with specified rules, for example, the link ID of a link whose lower end exists on the lower left side of the drawing is set as "1"; serial numbers are assigned to the following links until a first branch; and serial numbers are not assigned to links at a second branch and subsequent branches, but L1 is assigned again and the next ID is assigned to a link which follows L1 and exists downstream and to which no link ID has been assigned.

When comparing the first map data 600 illustrated in FIG. 2A with the second map data 700 illustrated in FIG. 2B, the second map data 700 has newly built roads which do not exist in the first map data 600. The newly built roads are, for example, the links L1 to L3 in the section T11 in the second map data 700. Since the link ID is assigned in accordance with the specified rules as mentioned above, some link ID's may not be the same as their prior link ID's. For example, the link L1 in the section T11 is different between FIG. 2A and FIG. 2B.

Incidentally, FIG. 2A and FIG. 2B show a departure place 111 in the section T11 and a destination 112 in the section T33. The departure place 111 and the destination 112 are indicated merely as a matter of convenience for the following explanation and are not included in the first map data 600 and the second map data 700.

(Configuration of First Map Data 600)

Figure 3:
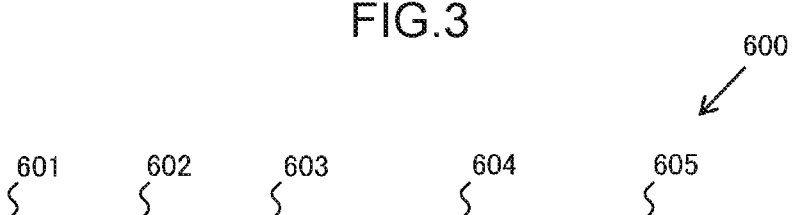
FIG. 3 is a diagram illustrating actual data of the first map data 600 visualized in FIG. 2A.

FIG. 3 is a diagram illustrating actual data of the first map data 600 which is visualized in FIG. 2A. The first map data 600 is configured of a plurality of records and each record has fields of a section ID 601, a link ID 602, starting point coordinates 603, ending point coordinates 604, a road type 605, and a cost 606. Each record stores information of a different link. However, the link ID is unique for each section as described earlier and the ID numbers are used redundantly in different sections. Therefore, regarding each record of the first map data 600 illustrated in FIG. 3, a combination of the section ID 601 and the link ID 602 is information which does not overlap with other records. Incidentally, in the processing described later, X_S represents an X-coordinate of the starting point coordinates 603, Y_S represents a Y-coordinate of the starting point coordinates 603, X_E represents an X-coordinate of the ending point coordinates 604, Y_E represents a Y-coordinate of the ending point coordinates 604, A represents the road type 605, and C represents the cost 606.

The section ID 601 field stores the aforementioned section ID such as T11. The link ID 602 field stores the aforementioned link ID such as L1. The fields of the starting point coordinates 603 and the ending point coordinates 604 store values of a starting point and an ending point of the relevant link in a coordinate system, regarding which the lower left of each section is (0, 0) and the upper right of each section is (100, 100). Incidentally, the coordinates (100, 100) of a certain section indicates the same position as the coordinates (0, 0) of a section which exists on the upper right side of the above-mentioned section.

The road type 605 field stores a value indicating the type of the relevant road. Regarding the correspondence between the value and the road type, for example, "2" represents a national road, "3" represents a prefectural road, "4" represents a municipal road, and "5" represents a minor street. Incidentally, the minor street tends to be avoided by those who are not familiar with the relevant area due to reasons such as a narrow road width. Therefore, if the user passes through a minor street which is different from guidance by the history information storage apparatus 100, it can be presumed that the user may know the minor street very well. The cost 606 field stores a value indicating the cost required to pass through the relevant link. This cost means that as the value is larger, it requires longer time to pass through the relevant link.

(Configuration of Second Map Data 700)

FIG. 4 is a diagram illustrating actual data of the second map data 700 which is visualized in FIG. 2B. A field structure of the second map data 700 is the same as that of the first map data 600. Incidentally, a note 707 indicated at the right end of FIG. 4 describes a link correspondence relationship between each link and the first map data 600 as a matter of convenience for the following explanation and is not information recorded in the second map data 700. Incidentally, in the processing described later, X_S' represents an X-coordinate of the starting point coordinates 703, represents a Y-coordinate of the starting point coordinates 703, represents an X-coordinate of the ending point coordinates 704, Y_E' represents a Y-coordinate of the ending point coordinates 704, A' represents the road type 705, and C' represents the cost 706.

For example, the value of the note 707 field for a link which does not exist in the first map data 600, but exists in the second map data 700 is indicated as "newly built"; and the value of the note 707 field for a link to which the same link ID is assigned in the first map data 600 and the second map data 700 is indicated as "no change." Furthermore, the value of the note 707 field for the same link whose link ID has changed from the first map data 600 to the second map data 700 is indicated as a combination of "old" and a "prior link ID." For example, a link L4 in the section T11 of the second map data 700 is the same as a link L1 in the section T11 of the first map data 600. Incidentally, "the same" herein mentioned means that at least the starting point coordinates of the relevant links match each other.

(Configuration of History Information 900)

FIG. 5 is a diagram illustrating an example of the history information 900. The history information 900 stores a history of a travel of the vehicle which has strayed from a route calculated and presented by the history information storage apparatus 100 to the user. Specifically, if the user travels only through the route presented by the history information storage apparatus 100, nothing will be recorded in the history information 900. FIG. 5A illustrates a state where only the travel history is written to the history information 900 and FIG. 5B illustrates the history information 900 which has been added in association with an update of the first map data 600 from the state illustrated in FIG. 5A. The history information 900 is configured of a plurality of records and each record has fields of a section ID 901, a history link ID 902, a road type 903, the number of travels 904, a withholding factor 905, and an expiration date 906. The fields of the section ID 901, the history link ID 902, and the road type 903 store information similar to that of the section ID, the link ID, and the road type in the first map data 600 or the second map data 700.

Examples of the history information 900 illustrated in FIG. 5A correspond to examples illustrated in FIG. 2A and FIG. 3 and a link L3 in the section T11 and a link L5 in the section T33 are included in the history information 900. Then, the road type of the former link is "3" and the road type of the latter link is "5." For example, a first row of the history information 900 illustrated in FIG. 5A shows that although the navigation unit 110 presented a route which will not pass through the link L3, for example, a direction from the link L1 towards the link L2 in the section T11 of the first map data 600, the vehicle strayed from the route presented by the navigation unit 110 and moved to the link L3. Incidentally, when the vehicle strays from the route presented by the navigation unit 110, it will be hereinafter referred to as "straying from the route."

The field of the number of travels 904 stores the number of times the vehicle strayed from the travel route presented by the navigation unit 110 and traveled through the link indicated in the relevant record. The fields of the withholding factor 905 and the expiration date 906 store information for judging whether or not the navigation unit 110 should use the relevant record after the update of the map. The withholding factor 905 field stores a factor, that is, a reason for the navigation unit 110 to temporarily invalidate the relevant record without considering it when calculating the route calculation. The expiration date 906 field stores a time limit for withholding the deletion of the record. If the user does not travel through the route indicated in the relevant record by straying from the presented route by that time limit, the record will be deleted. The detailed explanation will be provided later.

(Configuration of Change Content 920)

FIG. 6 is a diagram illustrating an example of the change content 920. The change content 920 is created for each section of the first map data 600 and the second map data 700. The change content 920 of each section is configured of a plurality of records and each record has fields of an updated link ID 921, a corresponding link ID 922, and a change 923. The number of records of the change content 920 is equal to the number of links in the second map data 700. The updated link ID 921 field stores the updated map, that is, the link ID of a link in the second map data 700.

The corresponding link ID 922 field stores the map before the update, that is, the link ID of a link corresponding to the link identified by the value in the updated link ID 921 field of the same record in the first map data 600. However, if no corresponding link exists in the first map data 600, a sign indicating no existence, for example, a hyphen is indicated. The change 923 field indicates classification of the relevant change. The classification includes, for example, newly built, a cost change, and no change. However, in FIG. 6, it is simply stated as "none" when there is no change.

(Configuration of Influence Range 940)

Figure 7:
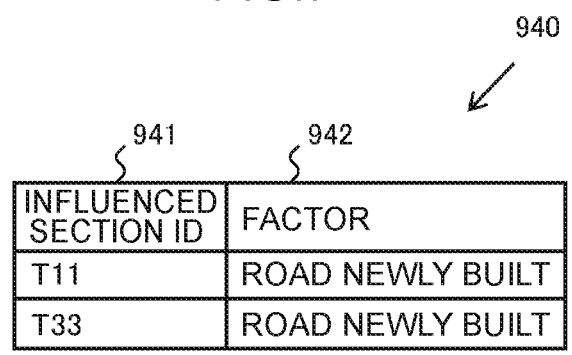
FIG. 7 is a diagram illustrating an example of an influence range 940.

FIG. 7 is a diagram illustrating an example of the influence range 940. The influence range 940 is configured of a plurality of records and each record has fields of an influenced section ID 941 and a factor 942. The influenced section ID 941 stores a section ID of a section influenced by an update of the first map data 600. The factor 942 stores a factor of the influence, that is, information indicating what kind of change has been made. For example, an example illustrated in FIG. 7 shows that the section ID T11 and the section ID T33 are influenced by new building of roads.

OPERATION EXAMPLES

Figure 8:
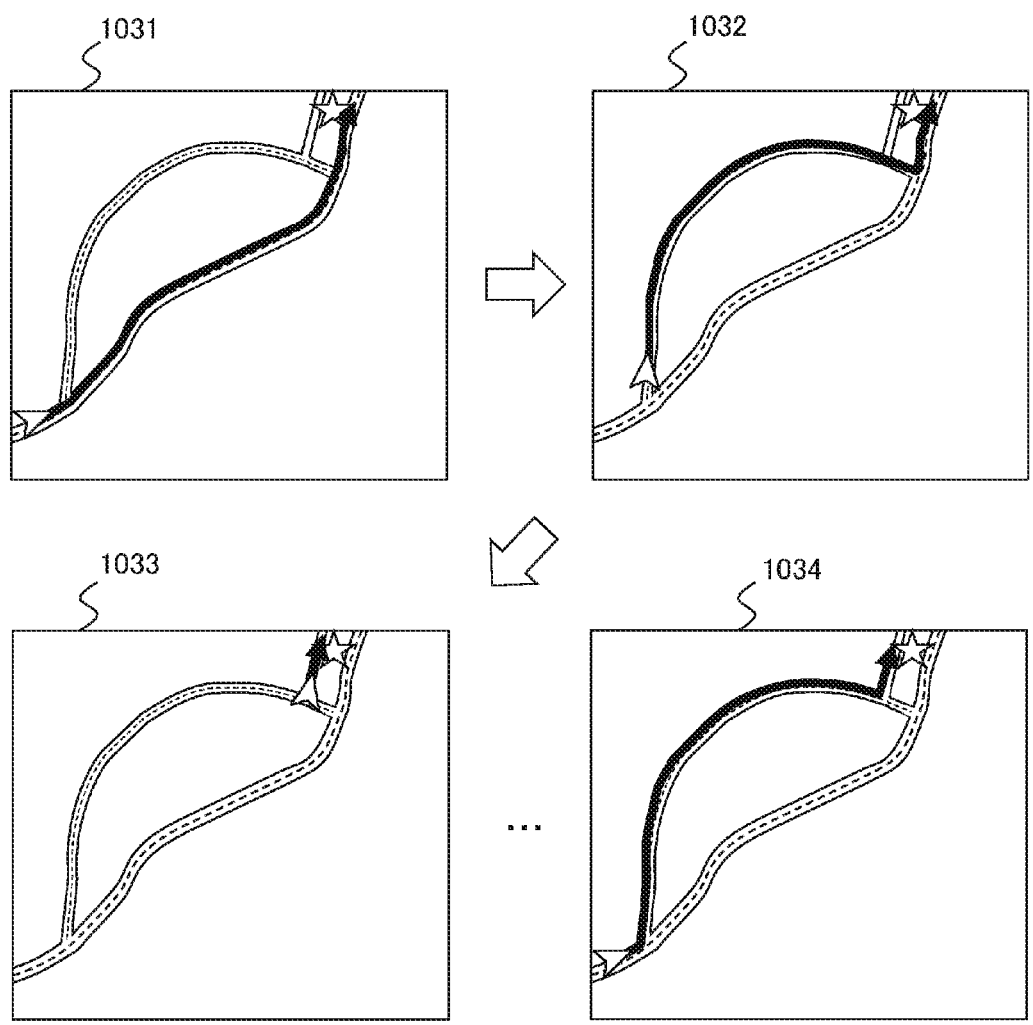
FIG. 8 is a diagram illustrating images displayed on a display unit 103.

Operations of the history information storage apparatus 100 and images displayed on the display unit 103 will be explained with reference to FIG. 8 and FIG. 9. FIG. 8 illustrates a route change presented by recording of the history information 900; and FIG. 9 illustrates, as a continued part of the situation illustrated in FIG. 8, a route presented after the history information 900 is recorded and then the first map data 600 is updated to the second map data 700. Incidentally, in FIG. 8 and FIG. 9, the information illustrated in FIG. 2 to FIG. 7 is referenced.

Operation Example: Before Map Update

FIG. 8 is a diagram illustrating the operations of the history information storage apparatus 100, specifically speaking, images displayed on the display unit 103 when the vehicle travels from the departure place 111 to the destination 112 as indicated in FIG. 2. However, the indication of the departure place 111 is omitted and the destination 112 is indicated as a star mark in FIG. 8 for reasons of figure drawing. However, nothing is recorded in the history information 900 in the initial state of FIG. 8.

A screen 1031 is an image displayed on the display unit 103 at the departure place 111. The screen 1031 shows a route which is indicated with a bold line and presented by the navigation unit 110 according to a known route search algorithm. The navigation unit 110 presents the route by performing a shortest route calculation with reference to the cost 606 in the first map data 600. The route indicated in the screen 1031 is a route with the lowest total sum of the cost 606 from among routes from the departure place 111 to the destination 112.

A screen 1032 is an image displayed on the display unit 103 when the vehicle moves and immediately after it has advanced in a direction different from the route, that is, immediately after the vehicle has moved to a position corresponding to the link L3 in the section T11 of the first map data 600. As the vehicle has strayed from the route, the navigation unit 110 presents a route indicated with a bold line as the shortest route from the current position of the vehicle to the destination 112.

A screen 1033 is an image displayed on the display unit 103 when the vehicle further moves and immediately after it has advanced again in a direction different from the route, that is, immediately after the vehicles has moved to a position corresponding to the link L5 in the section T33 in the first map data 600. As the vehicle has strayed from the route, the navigation unit 110 presents a new route indicated with a bold line. Every time such straying from the route occurs, a history of a link where the vehicle has traveled when having strayed from the route is recorded in the history information 900. Specifically speaking, if the vehicle has strayed from the route at a point on the link identified from information of the respective fields of the section ID 901 and the history link ID 902 of any one of the records already recorded in the history information 900, 1 is added to the value of the field of the number of travels 904 of that record in the history information 900. Furthermore, if the vehicle has strayed from the route at a point which is not recorded in the history information 900, a new record is added to the history information 900 and information about a link corresponding to that point is recorded in each field of the section ID 901, the history link ID 902 and the road type 903 and also 1 is added to the value of the field of the number of travels 904. The history information 900 illustrated in FIG. 5A shows that the operations indicated from the screen 1031 to the screen 1033 in FIG. 8 has been repeated five times.

A screen 1034 illustrates a screen presented after the history information 900 becomes as illustrated in FIG. 5A by repeating the above-described operations. As a result of learning the advancing direction of the vehicle from the history information 900, the navigation unit 110 eventually presents the route indicated in the screen 1034 where the user has passed, but not the shortest route indicated in the screen 1031, as the route from the departure place 111 to the destination 112.

Operation Example: After Map Update

FIG. 9 is a diagram illustrating operations of the history information storage apparatus 100 when the first map data 600 is updated by using the second map data 700 after the information illustrated in FIG. 5 is stored in the history information 900, that is, after the navigation unit 110 presents the route indicated in the screen 1034 in FIG. 8. FIG. 9 is specifically a diagram illustrating images displayed on the display unit 103 in the same manner as in FIG. 8. Incidentally, the detailed explanation will be provided later; however, once the first map data 600 is updated by using the second map data 700, information is written to the fields of the withholding factor 905 and the expiration date 906 of the history information 900.

A screen 1036 is a route presented by the navigation unit 110 immediately after the update of the first map data 600. Although the stray from the route is recorded in the history information 900, the history information storage apparatus 100 presents the route indicated in the screen 1036 because of a reason described later. Under this circumstance, the history information storage apparatus 100 may present the route while explaining to the user, with a speaker which is not illustrated in the drawing, for example, that "since the surrounding map has been updated, the latest route will be guided."

A screen 1037 is a route presented when the vehicle has advanced and strayed from the route. Specifically speaking, the screen 1037 is the route which is presented when the vehicle has advanced to the link L3 of the section T11 and which also passes through the link L5 of the section T33 where the vehicle has not advanced yet.

(Operating Sequence Diagram)

Figure 10:
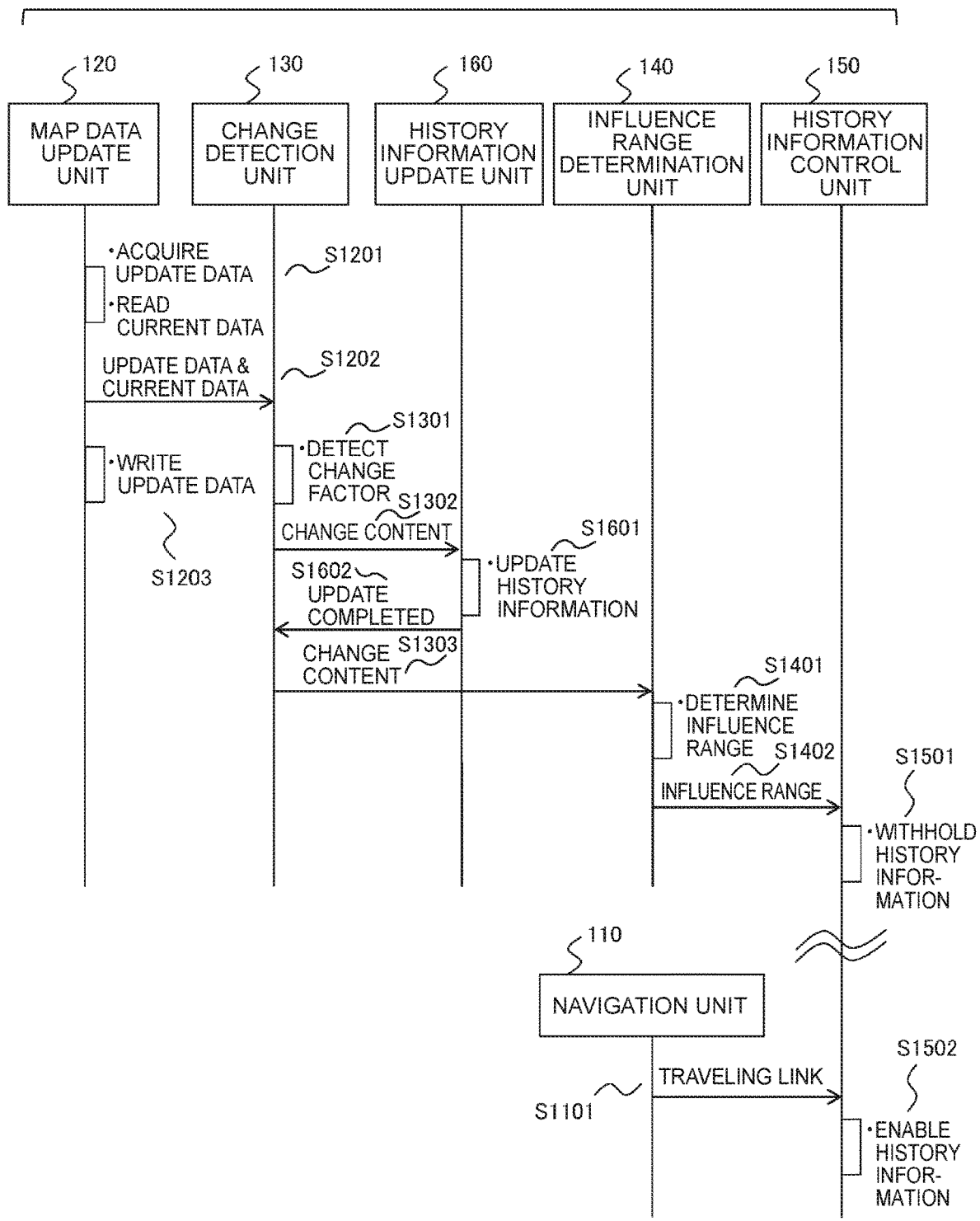
FIG. 10 is an operating sequence diagram of a history information storage apparatus 100.

FIG. 10 is an operating sequence diagram when updating the map in order for the history information storage apparatus 100 to perform the operations illustrated in FIG. 9. The map data update unit 120 firstly acquires the update data 791 of the section T11 from the map data distribution unit 210 of the map data distribution server 200 and reads the current data 691 of the section T11 from the first map data 600 (step S1201). Next, the map data update unit 120 transmits the acquired update data 791 and current data 691 to the change detection unit 130 (step S1202). After transmitting these pieces of data, the map data update unit 120 writes the update data 791 to the first map data 600 (step S1203).

After receiving the update data 791 and the current data 691, the change detection unit 130 detects the change content 920 (step S1301). The details of step S1301 will be explained later with reference to FIG. 11. Next, the change detection unit 130 transmits the detected change content 920 to the history information update unit 160 (step S1302). The history information update unit 160 executes processing for updating the history information 900 with reference to the received change content 920 (step S1601). The details of the processing in step S1601 will be explained later with reference to FIG. 14. After updating the history information 900, the history information update unit 160 notifies the change detection unit 130 of update completion (step S1602).

After receiving the update completion, the change detection unit 130 transmits the change content 920 to the influence range determination unit 140 (step S1303). The influence range determination unit 140 determines the influence range 940 with reference to the received change content 920 (step S1401). The details of the processing in step S1401 will be explained later with reference to FIG. 15. Next, the influence range determination unit 140 transmits the determined influence range 940 to the history information control unit 150 (step S1402). The history information control unit 150 executes processing for withholding the history information 900 with reference to the received influence range 940 (step S1501). The details of step S1501 will be explained later with reference to FIG. 16.

Subsequently, according to the travel of the vehicle, the navigation unit 110 transmits information about a link along which the vehicle is currently traveling (hereinafter referred to as a traveling link) to the history information control unit 150 (step S1101). The history information control unit 150 searches the history information 900 for a history relating to the traveling link with reference to the received information about the received traveling link and executes processing for deleting the withholding factor 905 and the expiration date 906 of the history information 900 (step S1502).

The entire sequence illustrating the operations of the map update system S according to the first embodiment has been explained above. The details of the individual processing will be explained below.

(Details of S1301)

Figure 11:
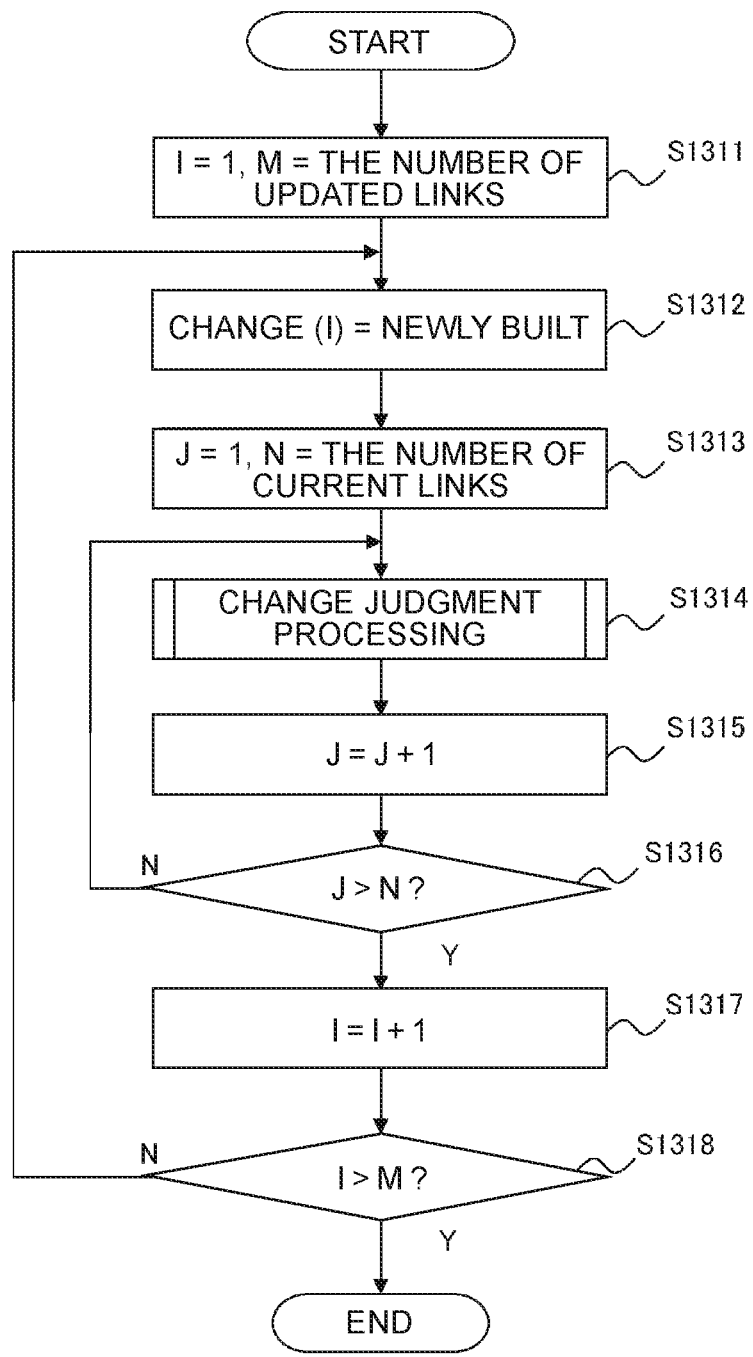
FIG. 11 is a flowchart illustrating operations of a change detection unit 130.

FIG. 11 is a flowchart illustrating the details of the change content detection processing executed by the change detection unit 130 in step S1301 in FIG. 10. The change detection unit 130 firstly assigns 1 to loop variable I and stores the total number of links existing in the update data 791 (hereinafter referred to as updated links) to variable M (step S1311). Incidentally, the value of the loop variable I corresponds to the number of a record in the processing target section of the change content 920 illustrated in FIG. 6. Next, the change detection unit 130 stores "newly built" to the change 923 in the 1-th row field of the section corresponding to the change content 920 (step S1312). The processing of this step is intended to set "newly built" as a default value for the value stored in the change 923 and overwrite it with a correct value only when the correct value is not "newly built."

Next, the change detection unit 130 sets 1 to variable J, which is a second loop counter, and stores the total number of links existing in the current data 691 (hereinafter referred to as current links) in variable N (step S1313). Then, the change detection unit 130 executes processing for judging a change of the I-th updated link (hereinafter referred to as the updated link (I)) and the J-th current link (hereinafter referred to as the current link (J)) (step S1314). The details of this processing will be explained with reference to FIG. 12. Next, the change detection unit 130 adds 1 to variable J (step S1315).

Then, the change detection unit 130 judges whether the variable J is a value exceeding the variable N or not; and if the change detection unit 130 determines that the variable J does not exceed the variable N, it returns to step S1314 and repeats the processing (step S1316). If the change detection unit 130 determines that the variable J exceeds the variable N, it adds 1 to the variable I (step S1317). Subsequently, the change detection unit 130 judges whether the variable I is a value exceeding the variable M or not; and if the change detection unit 130 determines that the variable I does not exceed the variable M, it returns to step S1312 and repeats the processing (step S1318). If the change detection unit 130 determines that the variable I exceeds the variable M, it terminates the processing illustrated in FIG. 11.

(Details of S1314)

Figure 12:
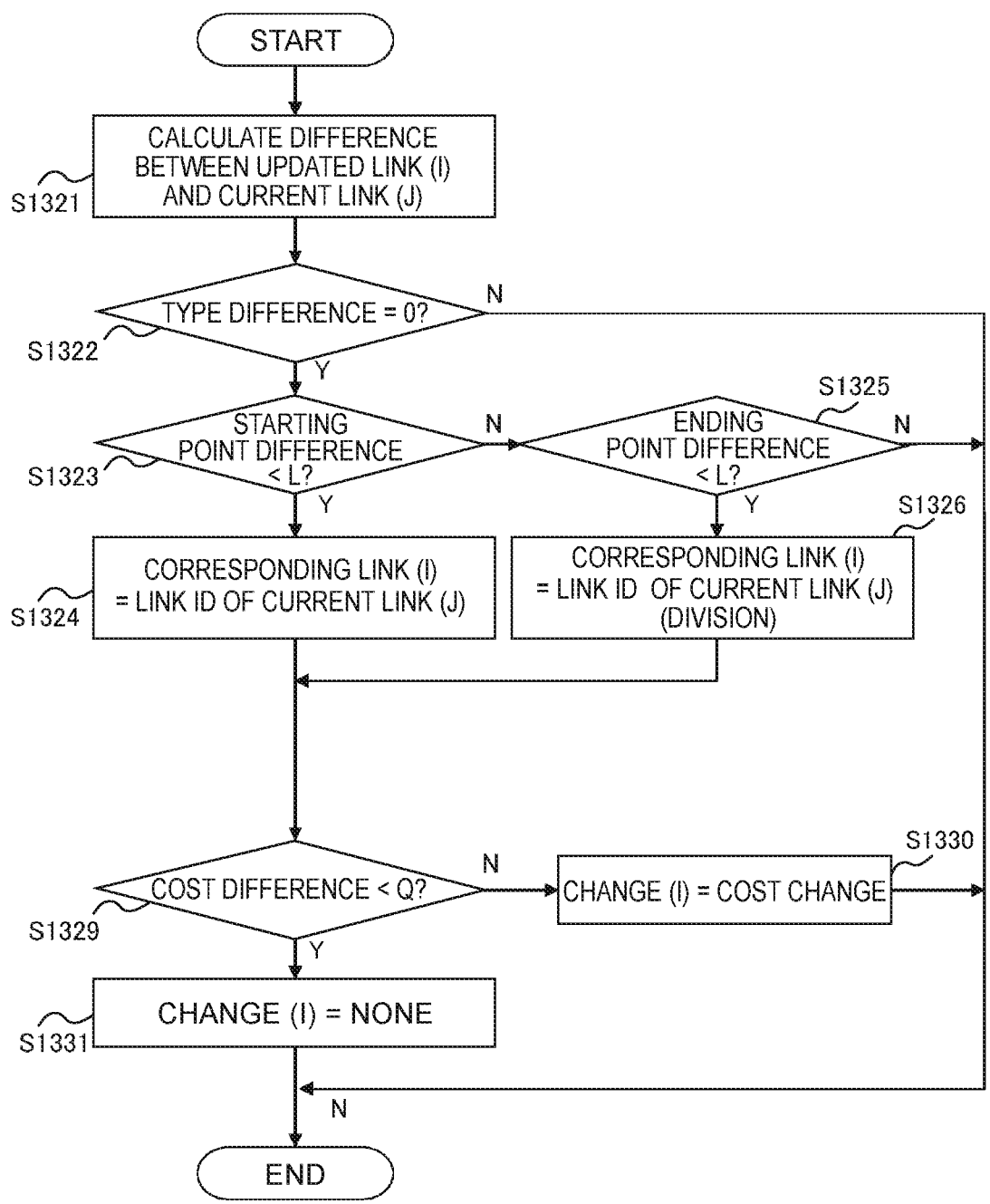
FIG. 12 is a flowchart illustrating the details of step S1314 in FIG. 11.

FIG. 12 is a flowchart illustrating the details of the change judgment processing in step S1314 in FIG. 11. The change detection unit 130 firstly calculates the difference between the updated link (I) and the current link (J) (step S1321). This calculation processing will be explained with reference to FIG. 13.

FIG. 13 is a diagram for explaining the outline of the calculation processing in step S1321. The change detection unit 130 calculates a starting point difference 913, an ending point difference 914, a type difference 915, and a cost difference 916 with respect to a combination of the updated link 911 and the current link 912. The starting point difference 913 is the distance between a starting point of the updated link 911 and a starting point of the current link 912 and indicates the Euclidean distance calculated from the X-coordinates and the Y-coordinates of both the starting points. Similarly, the ending point difference 914 indicates the distance between an ending point of the updated link 911 and an ending point of the current link 912. The type difference 915 indicates an absolute value of the difference between the road type of the updated link 911 and the road type of the current link 912. The cost difference 916 indicates an absolute value of the cost difference between the cost of the updated link 911 and the cost of the current link 912.

The starting point difference 913, the ending point difference 914, the type difference 915, and the cost difference 916 are expressed as the following mathematical formulas 1 to 4 by using the signs indicated in FIG. 3 and FIG. 4.

$$\text{Starting Point Difference} = SQRT\{(X\_S - X\_S')^2 + (Y\_S - Y\_S))^2\} \quad (1)$$

$$\text{Ending Point Difference} = SQRT\{(X\_E - X\_E')^2 + (Y\_E - Y\_E))^2\} \quad (2)$$

$$\text{Type Difference} = ABS\{A - A'\} \quad (3)$$

$$\text{Cost Difference} = ABS\{C - C'\} \quad (4)$$

It should be noted that SORT represents square-root operation and ABS represents absolute value operation.

Referring back to FIG. 12, the explanation of the change judgment processing will be continued. After step S1321, the change detection unit 130 judges whether the type difference 915 in FIG. 13 is 0 or not; and if the change detection unit 130 determines that the type difference 915 is not 0, it terminates the change judgment processing (step S1322). If the change detection unit 130 determines that the type difference 915 is 0, the change detection unit 130 judges whether the starting point difference 913 is less than a fixed threshold value L or not (step S1323). Incidentally, the threshold value L is a threshold value for judging whether the starting points or the ending points of the nodes are considered to be the same or not; and it is, for example, 1. If the change detection unit 130 determines that the starting point difference 913 is less than L, the change detection unit 130 stores the link ID of the current link (J) in the corresponding link (I), that is, as a value of the corresponding link 922 field of the I-th row in any one of sections of the change content 920 in FIG. 6 (step S1324).

If it is determined in step S1323 that the starting point difference 913 is not less than L, the change detection unit 130 judges whether the ending point difference 914 is less than L or not; and if the change detection unit 130 determines that the ending point difference 914 is not less than L, it terminates the change judgment processing (step S1325). If the ending point difference 914 is less than L, the change detection unit 130 stores the link ID of the current link (J) in the corresponding link (I) and stores information meaning that it is a division of the current link (J) (step S1326). Next, after step S1324 or step S1326, the change detection unit 130 judges whether the cost difference 916 is less than a fixed threshold value Q or not (step S1329). Incidentally, the threshold value Q is a threshold value for judging whether the costs are considered to be the same or not; and it is, for example, 1.

If it is determined that the cost difference 916 is not less than Q, the change detection unit 130 stores "cost change"

in the change (I) and terminates the change judgment processing (step S1330). If it is determined in step S1329 that the cost difference 916 is less than Q, the change detection unit 130 stores "none" in the change (I) and terminates the change judgment processing (step S1331). The above explanation has been provided about the change judgment processing.

(Details of S1601)

Figure 14:
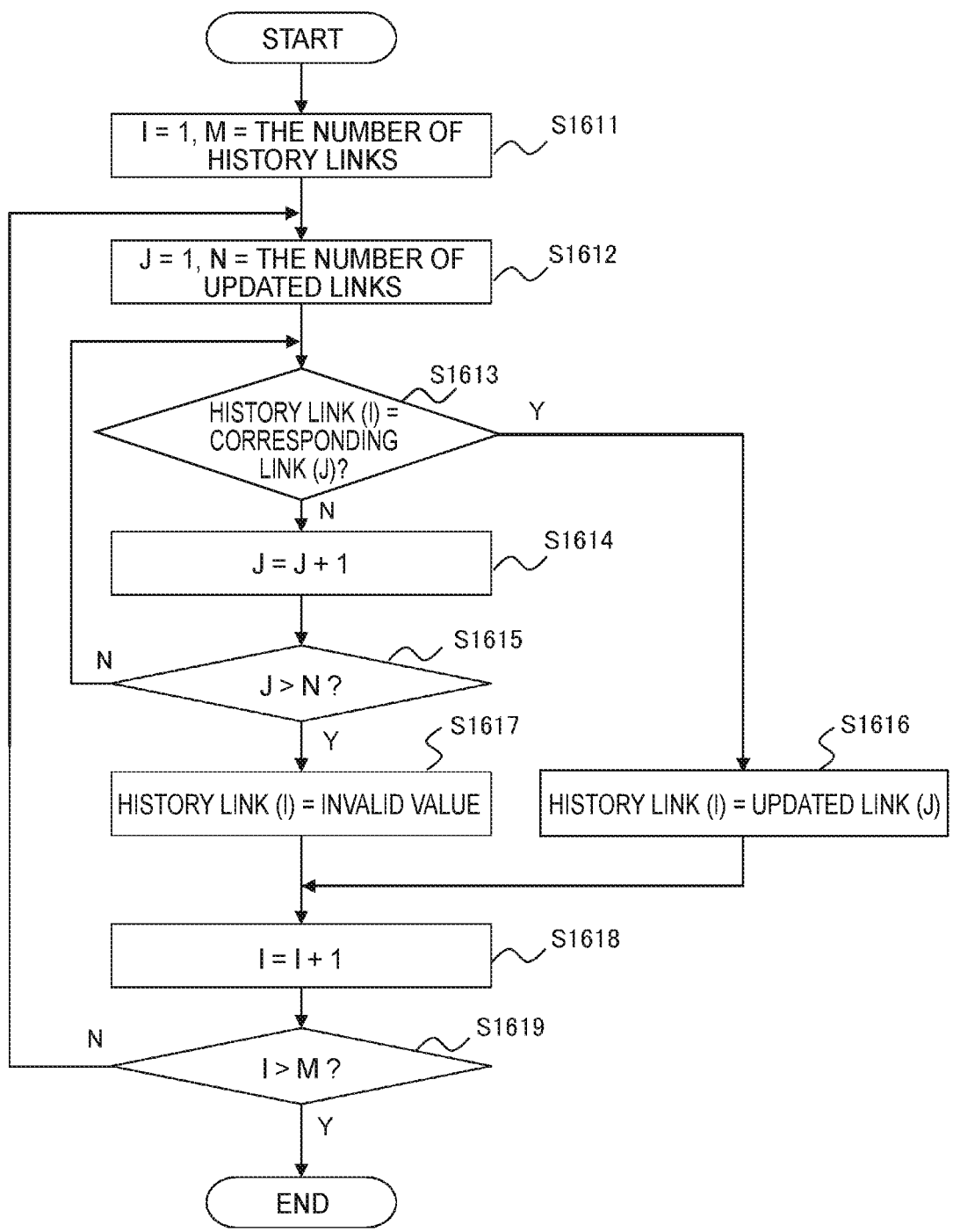
FIG. 14 is a flowchart illustrating the details of step S1601 in FIG. 10.

FIG. 14 is a flowchart illustrating the details of the history information update processing executed by the history information update unit 160 in step S1601 in FIG. 10. The history information update unit 160 firstly stores 1 in the first loop variable I and the number of rows of the history information 900 illustrated in FIG. 5A (hereinafter referred to as the "the number of history links") in variable M (step S1611). Next, the history information update unit 160 stores 1 in the second loop variable J and the number of rows of the change content 920 illustrated in FIG. 6 (hereinafter referred to as the "number of updated links") in variable N (step S1612).

Next, the history information update unit 160 judges whether the history link (I), that is, the history link 902 in the I-th row of the history information 900 illustrated in FIG. 5A and the corresponding link (J), that is, the corresponding link 922 in the J-th row in the processing target section of the change content 920 illustrated in FIG. 6 are the same or not (step S1613). If it is determined that the history link (I) and the corresponding link (J) are not the same, the history information update unit 160 adds 1 to the variable J (step S1614).

Then, the history information update unit 160 judges whether the variable J is larger than the variable N or not; and if it is determined that the variable J is equal to or less than the variable N, the history information update unit 160 returns to step S1613 and repeats the processing (step S1615). If it is determined that the variable J is larger than the variable N, the history information update unit 160 stores, in the history link (I), a value indicating that the link has disappeared due to the map update (step S1617).

If it is determined in step S1613 that the history link (I) and the corresponding link (J) are the same, the history information update unit 160 stores the link ID of the updated link (J) in the history link (I) (step S1616). Incidentally, this processing means that the link after the map update corresponding to the history link (I) is the updated link (J). After step S1617 or step S1616, the history information update unit 160 adds 1 to the variable I (step S1618). Next, the history information update unit 160 judges whether the variable I is larger than the variable M or not; and if it is determined that the variable I is equal to or less than the variable M, the history information update unit 160 returns to step S1612 and repeats the processing (step S1619). If the history information update unit 160 determines in step S1619 that the variable I is larger than the variable M, it terminates the history information update processing.

(Details of S1401)

Figure 15:
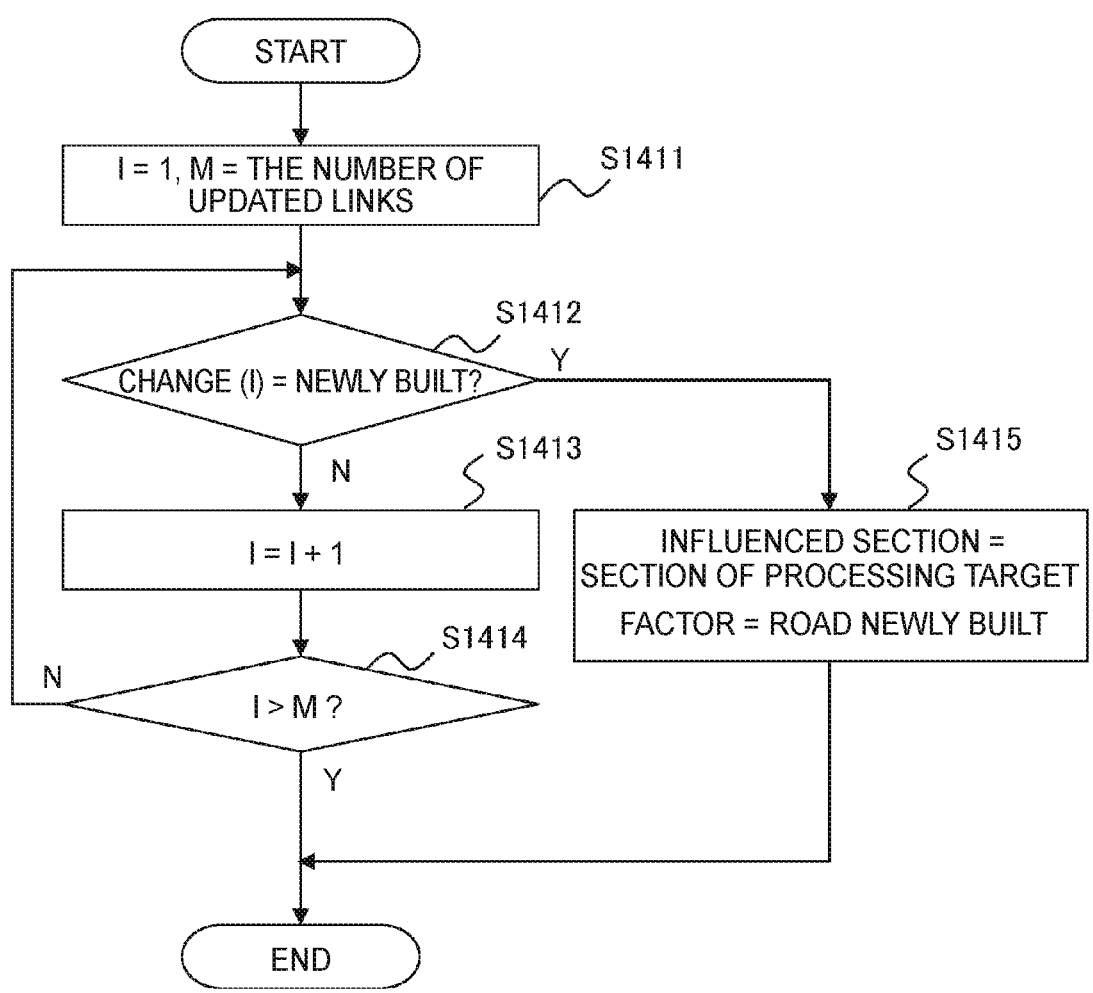
FIG. 15 is a flowchart illustrating the details of step S1401 in FIG. 10.

FIG. 15 is a flowchart illustrating the details of the influence range determination processing executed by the influence range determination unit 140 in step S1401 in FIG. 10. The influence range determination unit 140 firstly stores 1 in the loop variable I and stores the number of rows of the processing target section of the change content 920 illustrated in FIG. 6 (hereinafter referred to as the "number of updated links") in the variable M (step S1411). Next, the influence range determination unit 140 judges whether the change (I) is "newly built" or not (step S1412). If it is determined that the change (I) is "newly built," the influence range determination unit 140: adds, to the influence range 940, a record stating that the processing target section is the influenced section and the factor is new building of a road(s); and terminates the influence range determination processing (step S1415). Specifically, if the newly built road(s) exists within the section in step S1415, that section itself is recognized as the influence range.

As a result of the processing in S1415, for example, the information illustrated in FIG. 7 is written to each field of the influenced section 941 and the factor 942 of the influence range 940. If it is determined that the change (I) is not "newly built," the influence range determination unit 140 adds 1 to the variable I (step S1413). Then, the influence range determination unit 140 judges whether the variable I is larger than the variable M or not; and if it is determined that the variable I is equal to or less than the variable M, the influence range determination unit 140 returns to step S1412 and repeats the processing (step S1414). If it is determined that the variable I is larger than the variable M, the influence range determination unit 140 terminates the influence range determination processing.

(Details of S1501)

Figure 16:
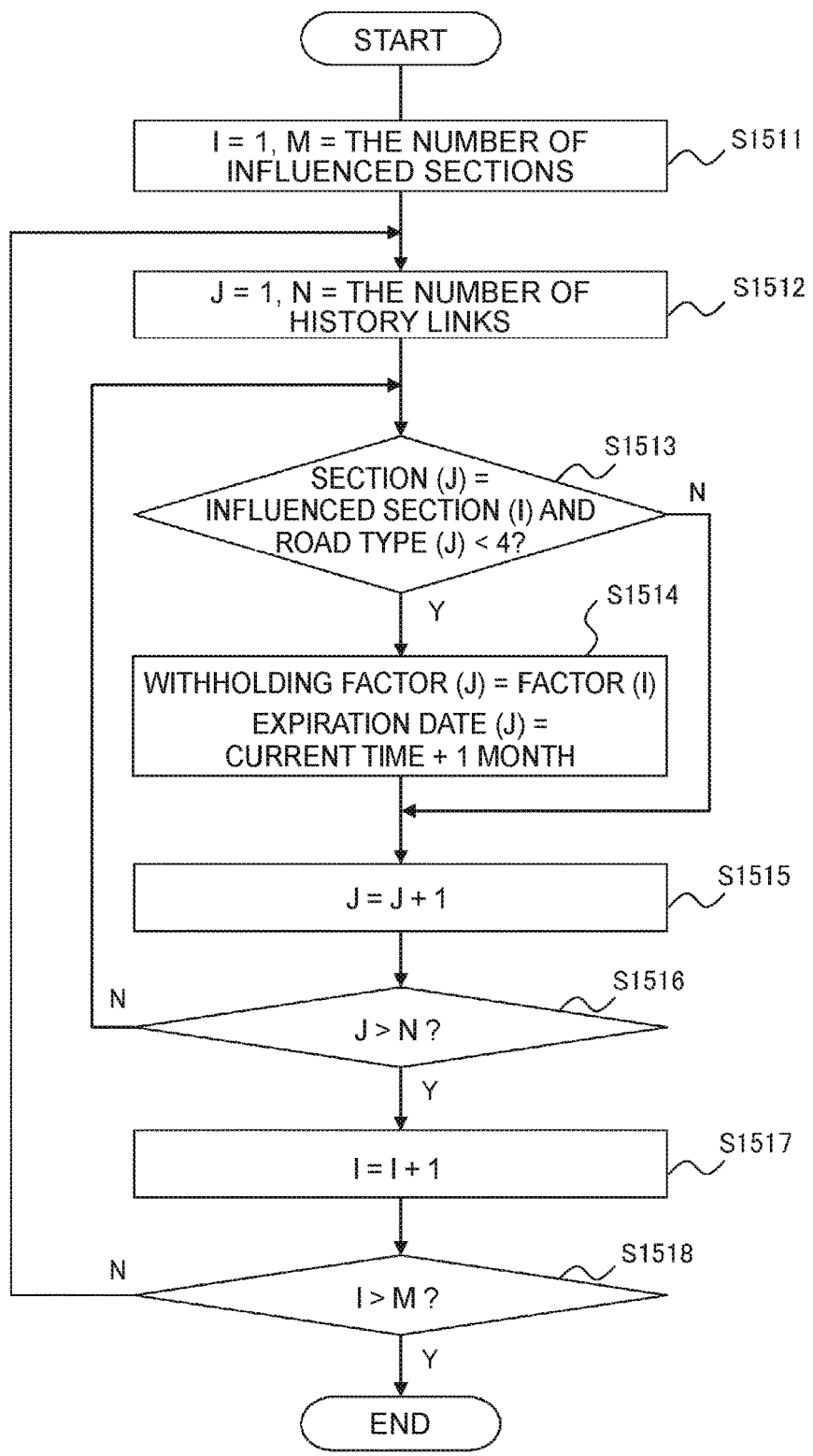
FIG. 16 is a flowchart illustrating the details of step S1501 in FIG. 10.

FIG. 16 is a flowchart illustrating the details of the history information withholding processing executed by the history information control unit 150 in step S1501 in FIG. 10. The history information control unit 150 firstly stores 1 in the first loop variable I and stores the number of rows of the influence range 940 illustrated in FIG. 7 (hereinafter referred to as "the number of influenced sections") in the variable M (step S1511). Then, the history information control unit 150 stores 1 in the second loop variable J and stores the number of rows of the history information 900 illustrated in FIG. 5 (hereinafter referred to as "the number of history links") in the variable N (step S1512).

Next, the history information control unit 150 judges whether or not the section (J) and the influenced section (I) are the same and whether or not the road type (J), for example, the road type 903 in the J-th row of the history information 900 illustrated in FIG. 5 is less than 4 (step S1513). The identity between the section (J) and the influenced section (I) can be judged by, for example, checking whether the section 901 in the J-th row of the history information 900 illustrated in FIG. 5 is identical to the influenced section 941 in the I-th row of the influence range illustrated in FIG. 7. Furthermore, when the road type 903 is less than 4, it indicates that the relevant road is a national road or a prefectural road.

If the history information control unit 150 determines in S1513 that the above-described conditions are satisfied, it stores the factor (I) in the withholding factor (J) and stores a date one month from the present in the expiration date (J) (step S1514). Specifically speaking, the history information control unit 150 stores the factor 942 in the I-th row of the influence range illustrated in FIG. 7 in the withholding factor 905 in the J-th row of the history information 900 illustrated in FIG. 5 and stores the date one month from the present in the expiration date 906 in the J-th row of the history information 900 illustrated in FIG. 5. Consequently, the record in the J-th row of the history information 900 is temporarily invalidated, so that the value of the number of travels 904 of that record will be ignored when the navigation unit 110 performs the route calculation in consideration of the history information 900.

After a negative judgment is obtained in step S1513, or following step S1514, the history information control unit 150 adds 1 to the variable J (step S1515). Next, the history information control unit 150 judges whether the variable J is larger than the variable N or not; and if it is determined that the variable J is equal to or less than the variable N, the history information control unit 150 returns to step S1513 and repeats the processing (step S1516). If it is determined that the variable J is larger than the variable N, the history information control unit 150 adds 1 to the variable I (step S1517). Then, the history information control unit 150 judges whether the variable I is larger than the variable M or not; and if it is determined that the variable I is equal to or less than the variable M, the history information control unit 150 returns to step S1512 and repeats the processing (step S1518). If it is determined that the variable I is larger than the variable M, the history information control unit 150 terminates the history information withholding processing.

The history information 900 illustrated in FIG. 5B is the history information 900 rewritten by the history information withholding processing explained with reference to FIG. 16. As compared with the history information 900 illustrated in FIG. 5A, the value of the history link 902 has been modified to a value corresponding to the second map data 700. Furthermore, in FIG. 5B, values are stored in the withholding factor 905 and the expiration date 906.

(Operations of Navigation Unit 110)

Preprocessing for the route calculation by the navigation unit 110, that is, handling of the history information 900 by the navigation unit 110 will be explained with reference to FIG. 17. After receiving a route search instruction from the user, the navigation unit 110 starts processing illustrated in FIG. 17. Firstly, the navigation unit 110 sets all the records stored in the history information 900 as targets and executes the processing from step S1911 to step S1916 on each record sequentially one by one as a processing target. However, no specific processing is executed in step S1911 and step S1916. Also, if no record is stored in the history information 900, the navigation unit 110 executes step S1920.

In step S1912 executed after step S1911, the navigation unit 110 judges whether or not the record of the processing target has some value indicated in the withholding factor 905 field. If the navigation unit 110 determines that some withholding factor is indicated, it proceeds to step S1913; and if the navigation unit 110 determines that the withholding factor is not indicated, it proceeds to step S1915. Incidentally, in step S1912, the navigation unit 110 may make the judgment based on the value of the expiration date 906 field instead of the withholding factor 905.

In step S1913 executed when an affirmative judgment is obtained in step S1912, the navigation unit 110 judges whether the time limit stored in the expiration date 906 field of the record of the processing target has passed or not. If the navigation unit 110 determines that the time limit has passed, that is, the current date is a date after the indicated time limit, it proceeds to step S1914; and if a negative judgment is obtained, the navigation unit 110 proceeds to step S1916. In step S1914, the navigation unit 110 causes the history information control unit 150 to delete the record of the processing target from the history information 900 and proceeds to step S1916.

In step S1915 executed when a negative judgment is obtained in step S1912, the navigation unit 110 adds the record of the processing target as an object to be considered and proceeds to step S1916. After executing the processing from step S1911 to step S1916 with respect to all the records included in the history information 900, the navigation unit 110 proceeds to step S1920. In step S1920, the navigation unit 110 performs the route calculation in consideration of the record of the history information 900 added as the object to be considered in step S1915. Then, the navigation unit 110 terminates the processing illustrated in FIG. 17.

As a result of the processing explained above with reference to FIG. 1 to FIG. 17, the history information 900 is modified to the values illustrated in FIG. 5B. When the map is updated, the navigation unit 110 can take over the history information and present a route as illustrated in FIG. 9 by referring to the history information 900 illustrated in FIG. 5B. Incidentally, the reason why the route is presented as illustrated on the screen 1036 in the operation example shown in FIG. 9 is because the reference to the first row of the history information 900 illustrated in FIG. 5B is withheld. Furthermore, the reason why the route is presented as illustrated in the screen 1037 is because the history link 902 in the second row of the history information 900 illustrated in FIG. 5B is modified to the link ID in the second map data 700, that is, the history information has been taken over.

The following operational advantages can be obtained according to the above-described first embodiment.

(1) The history information storage apparatus 100 includes: the storage unit 102 that stores the history information 900 and the first map data 600 divided into sections; the change detection unit 130 that detects a change of the first map data 600; the influence range determination unit 140 that determines a section influenced by the change; the history information control unit 150 that invalidates the history information 900 relating to the influenced section among the history information 900; and the navigation unit 110 that calculates a route in consideration of the history information 900 and records, in the history information 900, a history of a travel which has strayed from the calculated route.

Therefore, when the first map data 600 is updated, the route designed according to the latest situation can be calculated by temporarily invalidating the history information 900 of the section influenced by the change. For example, when the first map data 600 is updated and information of a newly built road is added, the history information storage apparatus 100 can calculate a route which passes through the newly built road.

(2) The navigation unit 110 records, in the history information 900, a link to a travel of the vehicle which has strayed from the route. The road type of each link is recorded in the first map data 600. The history information control unit 150 invalidates the history information which is included in the influenced section and regarding which the road type of the link is less than 4, that is, a national road or a prefectural road. If straying from the route has occurred on a minor street or a municipal road, it is presumed that the user must know that link very well and, therefore, it would be considered inappropriate to invalidate the history information about such road.

(3) The history information storage apparatus 100 includes: the communication unit 106 that receives the second map data 700 which is information to update the first map data 600; and the map data update unit 120 that updates the first map data 600 by using the second map data 700. The change detection unit 130 detects a change by comparing the first map data 600 before an update by the map data update unit 120 with the first map data 600 after the update by the map data update unit 120. Therefore, the history information storage apparatus 100 can detect the change made in association with the update of the map.

(4) The change of the map data includes new building of a road and the influence range determination unit 140 determines a section where the newly built road exists as the influence range. Therefore, the history information 900 of the section including the newly built road because of the update is temporarily invalidated, so that a route which passes through the newly built road can be calculated.

(5) The navigation unit 110 records, in the history information 900, a link to a travel of the vehicle which has strayed from the route. The history information control unit 150: temporarily invalidates a record relating to a link included in the influenced section in the history information 900 by setting a specified time limit (step S1514 in FIG. 16); and deletes the link included in the section if the vehicle does not travel along the link included in the section by straying from the route by the specified time limit (step S1914 in FIG. 17). The history information control unit 150 further cancels invalidation of the link included in the section if the vehicle travels along the link included in the section by straying from the route by the specified time limit (step S1502 in FIG. 10). Therefore, the history information 900 which has been accumulated before updating the first map data 600 can be usefully utilized. Specifically speaking, the number of travels is recorded for each link in the history information 900, so that the number of travels which was previously recorded can be taken over and used by canceling the invalidation of the link.

(6) The history information storage apparatus 100 includes the history information update unit 160 that rewrites the link to the history information relating to the influenced section in accordance with the second map data. Accordingly, even if the link number is changed due to an addition or deletion of a link, the history information update unit 160 rewrites the changed link number to an appropriate link number and, therefore, the history information 900 can be utilized effectively.

(Variation 1)

In the first embodiment, the section in which the newly built link is included is determined as the influenced section. However, the method for determining the influence range is not limited to this example. For example, not only the newly built link, but also a section including a link whose road type has been changed may be included in the influence range 940.

Figure 18:
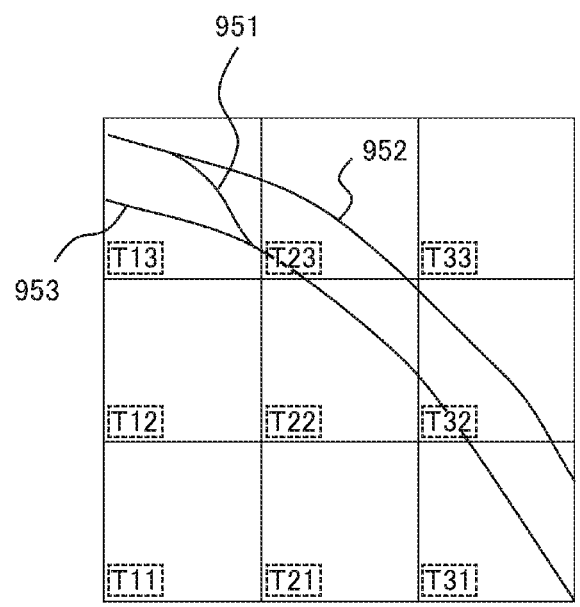
FIG. 18A is a schematic diagram of roads in Variation 1 and FIG. 18B is a diagram illustrating the influence range 940 corresponding to FIG. 18A.

FIG. 18 is a diagram illustrating an example of the influence range 940 in Variation 1. FIG. 18A is a schematic diagram of roads and FIG. 18B is a diagram illustrating the influence range 940 corresponding to FIG. 18A. Of three roads indicated with the reference numeral 951 to the reference numeral 953 illustrated in FIG. 18A, the roads indicated with the reference numeral 952 and the reference numeral 953 have conventionally existed. The road indicated with the reference numeral 951 has been added by an update, that is, it has been newly built and, furthermore, the road type of the roads indicated with the reference numeral 952 and the reference numeral 953 has been changed from prefectural roads to national roads.

Under the above-described circumstance, regarding the influence range in this variation, not only the section T13 which includes the newly built road 951, but also the sections T23, T22, T32, and T31 in which there has been the change of the road type are included in the influence range 940. Therefore, considering that the influence range 940 includes the sections T13, T23, T22, T32, and T31 and the change of the road type was caused by new building of the road, all their factors 942 will become "new building of the road." However, by considering the new building of the road and the change of the road type as independent changes, the factor 942 for only T13 may be set as the "newly built road" and the factors 942 for T22, T23, T31, and T32 may be set as the "road type change."

The following operational advantages can be obtained according to this variation.

(7) The change of the map data includes a change of the road type. The influence range determination unit 140 determines a section where a road whose road type has changed exists as the influence range. Even if the road has conventionally existed, the change of its road type may possibly cause a change of traffic. So, an appropriate route can be calculated by determining the relevant section as the influence range.

(Variation 2)

In the first embodiment, a section including a newly built link is determined as the influence range. However, a section which has not been changed directly due to the update, but may possible be influenced may be included in the influence range. For example, a section including a road for which a newly built road may possibly be an alternative route may be included in the influence range 940.

Figure 19:
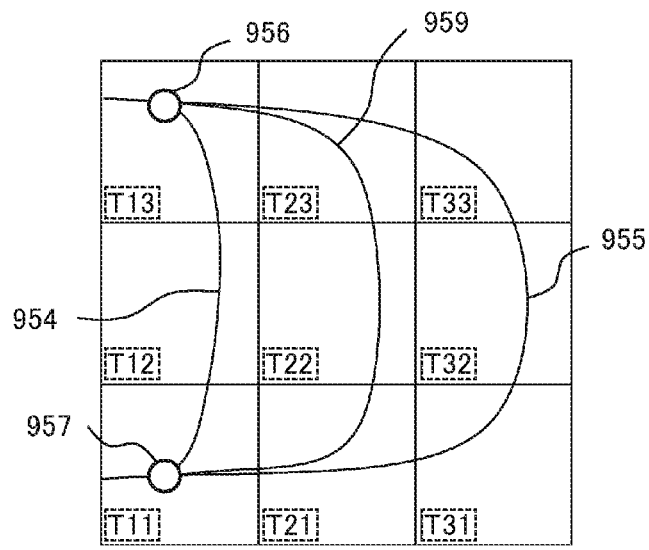
FIG. 19A is a schematic diagram of roads in Variation 2 and FIG. 19B is a diagram illustrating the influence range 940 corresponding to FIG. 19A.

FIG. 19A is a schematic diagram of roads and FIG. 19B is a diagram illustrating the influence range 940 corresponding to FIG. 19A. Roads indicated with the reference numeral 955 and the reference numeral 959 have conventionally existed. A road indicated with the reference numeral 954 has been added by an update, that is, it has been newly built. In this case, according to the first embodiment, only the sections T11, T12, and T13 where the newly built road, that is, the newly built link exists are included in the influence range 940. However, in this variation, sections in which alternative routes exist are included in the influence range 940 as described below.

The influence range determination unit 140 firstly focuses on an intersection point 956 and an intersection point 957 which are intersection points between the newly built road 954 and the existing roads. Then, the influence range determination unit 140 calculates a route(s) which is to move from the intersection point 956 to the intersection point 957 and which does not pass through the newly built road 954. The route(s) calculated under this circumstance may be only the route with the minimum cost or a plurality of routes in ascending order of the cost, for example, three routes may be calculated. For example, if only the route with the minimum cost is calculated, the road indicated with the reference numeral 959 is calculated.

Therefore, if the alternative route is determined as the route with the minimum cost, the influence range 940 is as illustrated in FIG. 19B. Specifically, the influenced section ID 941 stores, in addition to the sections T11, T12, and T13 where the newly built road 954 exists, the sections T21, T22, and T23 where the alternative route exists. Then, the factors 942 for all these sections become the newly built road.

The following operational advantage can be obtained according to this variation.

(8) The influence range determination unit 140 determines a section where an alternative route for the road in which the change has been detected exists as the influenced section. Therefore, even if there is no change in a certain link itself, it is assumed that the influence of a change at some other position may spread to the above-mentioned link; and, therefore, the section which did not have any direct change can be also determined as the influence range.

(Variation 3)

In the aforementioned first embodiment, when the reference is made to the value of the expiration date 906 field of the history information 900 and if the current date is beyond the expiration date 906, the relevant record is deleted. However, if a specified condition is satisfied even without waiting for the expiration date 906 to elapse, the relevant record may be deleted. The specified condition would be, for example, when the number of times the vehicle has traveled at the point identified by the section ID 901 and the history link ID 902 along the advancing direction presented by the navigation unit 110, that is, the number of times the vehicle has not strayed from the route becomes equal to or more than a fixed number of times.

(Variation 4)

Figure 17:
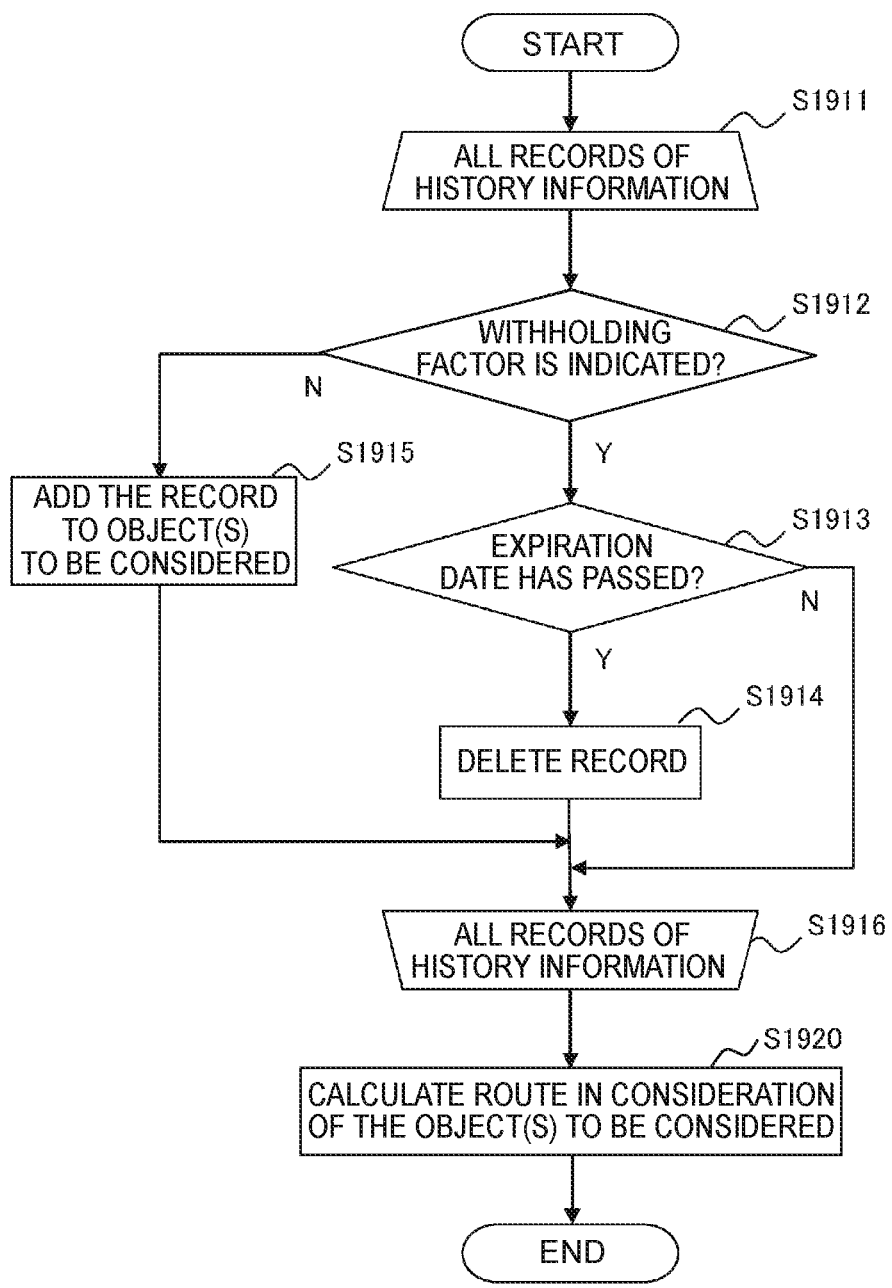
FIG. 17 is a flowchart illustrating operations of a navigation unit 110.

In the aforementioned first embodiment, the navigation unit 110 serving as the subject identifies a record which has passed the time limit and causes the history information control unit 150 to delete the record as illustrated in step S1914 in FIG. 17, However, the history information control unit 150 may read all the records of the history information 900, for example, at a specified timing, for example, at the timing of first activation during a day and identify and delete the record which has passed the time limit.

(Variation 5)

In the aforementioned first embodiment, whether the links are the same or not is judged by checking whether the positions of the starting points of the links are within a specified range or not. However, whether the links are the same or not may be judged not only based on the positions of the starting points of the links, but also in consideration of inclination on the map. The inclination on the map would be, for example, an evaluation method by setting the angle of a link extending in the north-south direction as 0 degree and the direction of a link extending in the east-west direction as 90 degrees.

(Variation 6)

In the aforementioned first embodiment, freeways are not included in the road types; however, the freeways may be treated in the same manner as the national roads. Furthermore, whether the road type is less than 4 or not is judged in step S1513 in FIG. 16; however, whether the road type is equal to or less than 4 or not may be judged. Specifically, minor streets and other roads may be classified. Furthermore, the road type may be set on the basis of the road width. In that case, as the road width is wider, the value of the road type becomes smaller; and as the road width is narrower, the value of the road type becomes larger.

Second Embodiment

A second embodiment of the map update system S will be explained with reference to FIG. 20 to FIG. 24. In the following explanation, the same reference numerals are assigned to constituent elements which are the same as those in the first embodiment and their differences will be mainly explained. Points which will not be particularly explained are the same as those in the first embodiment. The main differences between this embodiment and the first embodiment are that in this embodiment, a server detects the change factor and the influence range and an increase/decrease of links in association with an update of the map is not assumed. In this embodiment, it is assumed that the cost of links will change.

Figure 20:
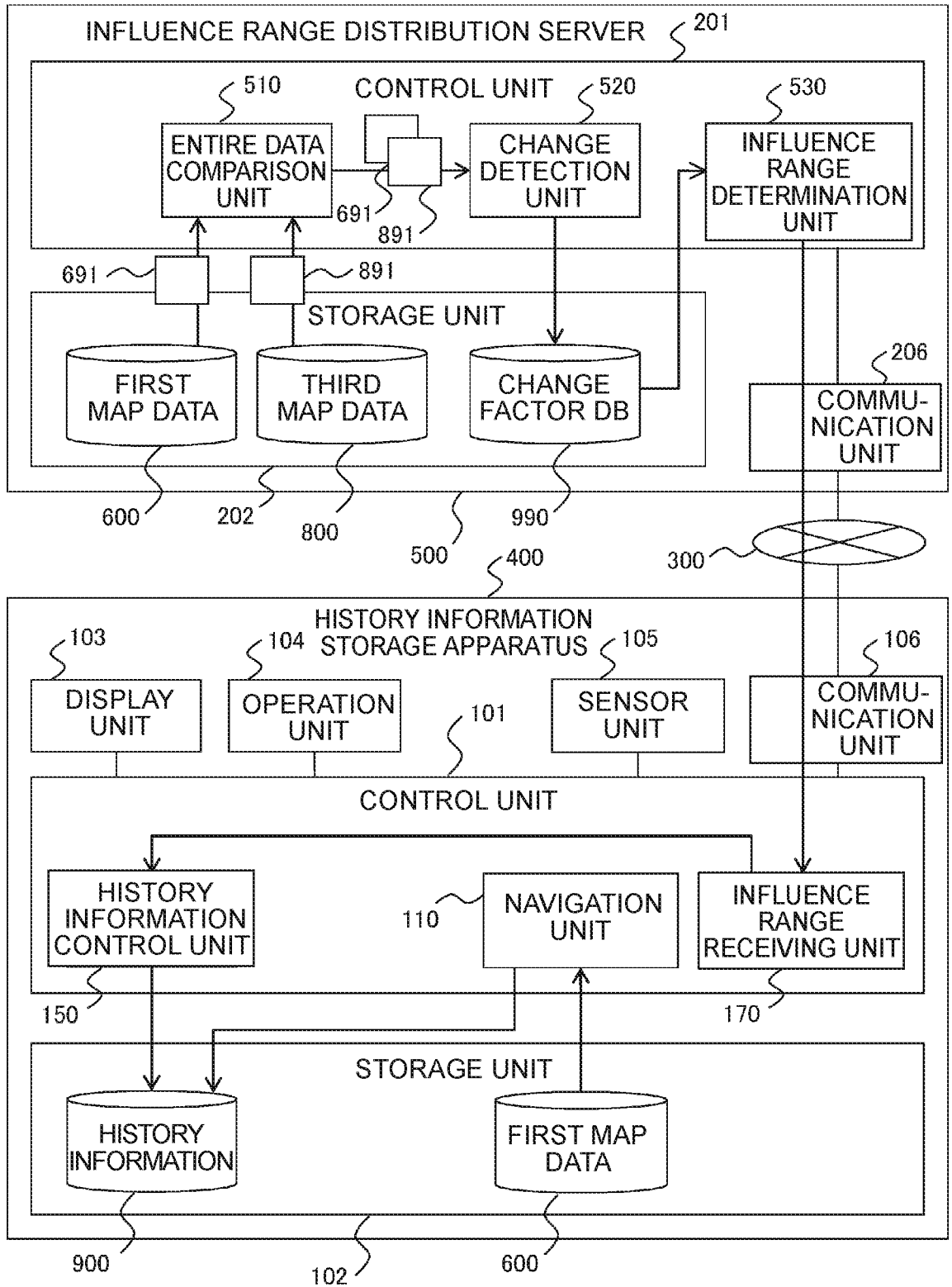
FIG. 20 is an overall configuration diagram of a map update system Sa according to a second embodiment.

FIG. 20 is an overall configuration diagram of an influence range distribution system Sa according to the second embodiment. A history information storage apparatus 400 and an influence range distribution server 500 are connected via the communication network 300. Regarding the history information storage apparatus 400 as compared with the history information storage apparatus 100 according to the first embodiment, the map data update unit 120, the change detection unit 130, the influence range determination unit 140, and the history information update unit 160 are deleted and an influence range receiving unit 170 is added. Regarding the influence range distribution server 500 as compared with the map data distribution server 200 according to the first embodiment, the map data distribution unit 210 and the second map data 700 are deleted and an entire data comparison unit 510, a change detection unit 520, an influence range determination unit 530, first map data 600, third map data 800, and a change factor DB 990 are added. The first map data 600 and the history information 900 are configured in the same manner as those in the first embodiment.

FIG. 21 is a diagram illustrating the configuration of, and information stored in, the third map data 800 illustrated in FIG. 20. The configuration of the third map data 800 is the same as that of the first map data 600. The information stored in the third map data 800 is almost the same as that stored in the first map data 600; and the only difference between them is that regarding a record with the section ID "T22" and the link ID "L2," the value of the cost 806 field is "2." Incidentally, an arrow is added in order to clearly indicate the different field in FIG. 21.

With the history information storage apparatus 400 according to the second embodiment, the history information 900 illustrated in FIG. 5 is recorded in the storage unit 102 in the same manner as in the first embodiment by performing the operations illustrated in FIG. 8 according to the first embodiment.

(Operation Outline of History Information Storage Apparatus 400)

Figure 22:
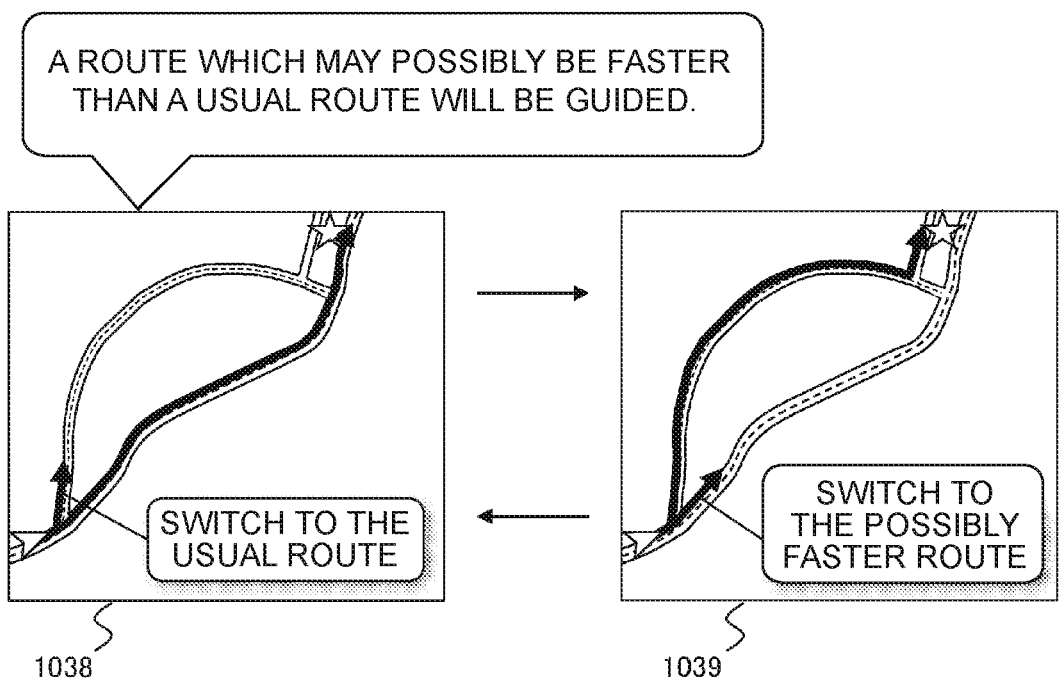
FIG. 22 is a diagram for explaining the outline of operations of a history information storage apparatus 400.

FIG. 22 is a diagram for explaining the outline of operations of the history information storage apparatus 400 when the vehicle travels from the departure place 111 to the destination 112 as illustrated in FIG. 2 as the history information storage apparatus 400 receives the influence range 940 from the influence range distribution server 500. A screen 1038 is a route calculated and presented by the navigation unit 110 after receiving the influence range 940. When presenting the route according to the history information 900 which has been accumulated, the route indicated on the screen 1034 in FIG. 8 is presented; however, in this embodiment, the route indicated on the screen 1038 is presented, but not the route calculated based on the history information 900. Furthermore, the history information storage apparatus 400 displays an advancing direction indicated by the route calculated based on the history information 900 and displays "switch to the usual route" that is a button for presenting the route calculated based on the history information 900.

A screen 1039 is a screen displayed by the navigation unit 110 when the "switch to the usual route" button is pressed by the user. The screen 1039 indicates a route similar to that of the screen 1034 in FIG. 8 and further displays "switch to the possibly faster route" that is a button for returning to the screen 1038.

Figure 23:
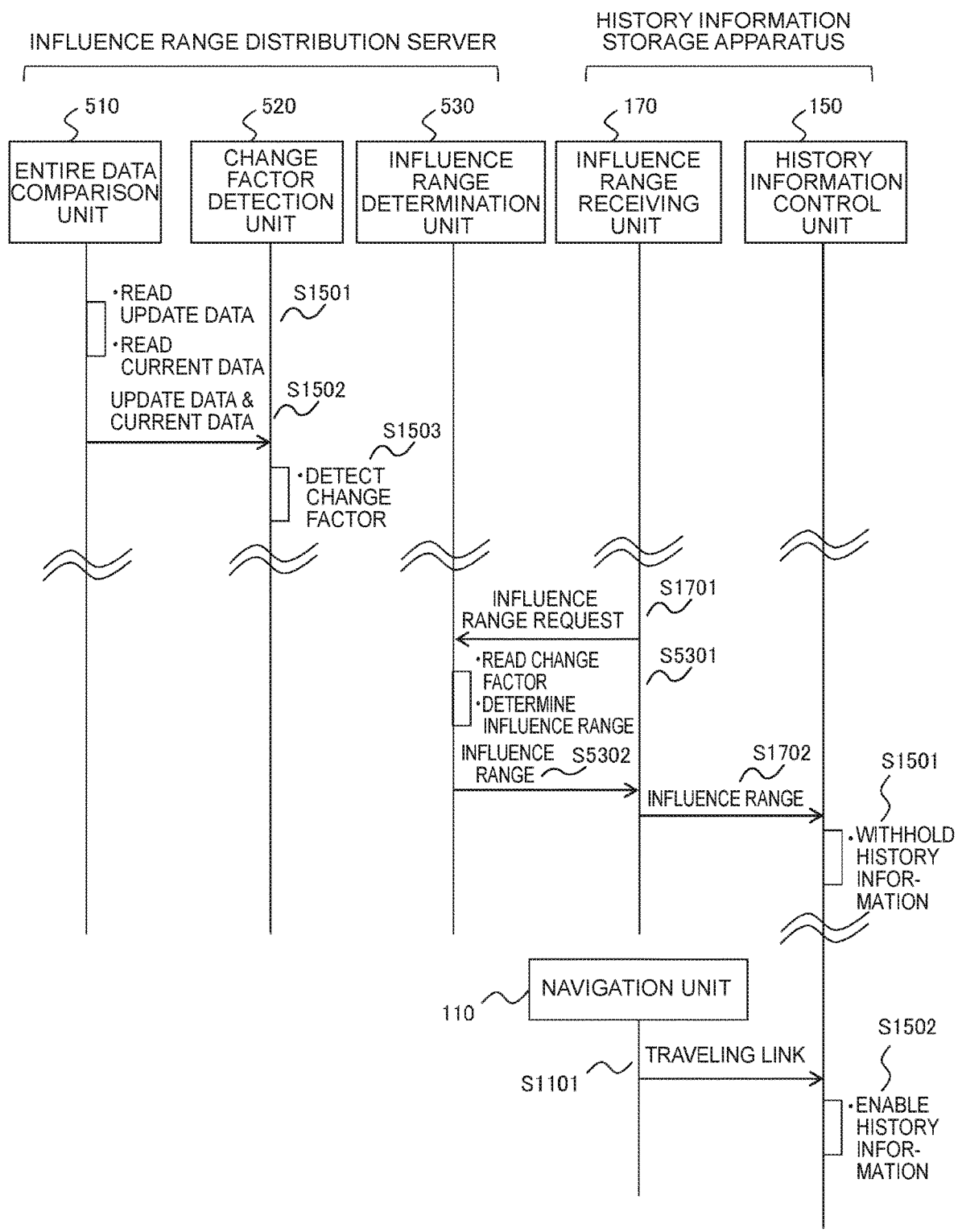
FIG. 23 is an operating sequence diagram of the map update system Sa.

FIG. 23 is an operating sequence diagram illustrating a sequence of modification of the history information 900 at the history information storage apparatus 400. Firstly, with the influence range distribution server 500, the entire data comparison unit 510 reads the update data 891 of the section T11 from the third map data 800 and also reads the current data 691 of the section T11 from the first map data 600 (step S5101). Next, the entire data comparison unit 510 transmits the update data 891 and the current data 691, which have been read, to the change detection unit 520 (step S5102). After receiving the update data 891 and the current data 691, the change detection unit 520 executes processing for detecting the change content 920 and records the detected change factor in the change factor DB 990 (step S5103).

Incidentally, the details of the change content detection processing are similar to those of the first embodiment. The change detection unit 520 executes the change content detection processing on all the sections included in the first map data 600 and records the change factors of all the sections in the change factor DB 990. Next, with the history information storage apparatus 400, the influence range receiving unit 170 sends a request for the influence range to the influence range determination unit 530 of the influence range distribution server 500 (step S1701). This request includes information indicating a section for which the influence range is requested, for example, a section around the point where the history information storage apparatus 400 exists.

Next, the influence range determination unit 530 reads the change content 920 of the requested section from the change factor DB 990 and determines the influence range 940 with reference to the read change content 920 (step S5301). The details of this processing are similar to the content explained with reference to FIG. 15 according to the first embodiment. Then, the influence range determination unit 530 transmits the determined influence range 940 to the influence range receiving unit 170 of the history information storage apparatus 400 (step SS5302).

Subsequently, the influence range receiving unit 170 transmits the received influence range 940 to the history information control unit 150 (step S1702). The history information control unit 150 executes processing for withholding the history information 900 by referring to the received influence range 940 (step S1501). The details of this processing are similar to the content explained with reference to FIG. 16. Subsequently, the processing for enabling the history information 900 according to the travel of the vehicle is similar to that of the first embodiment.

FIG. 24 is a diagram illustrating the change content 920 in the section T22 which is generated by the operating sequence explained in FIG. 23, the influence range 940 by this change factor, and the history information 900 which has been modified in accordance with these pieces of information. With the change content 920, the change which is a "cost change" is detected as a result of the cost change of the link L2 in the section T22. With the influence range 940, as a result of the cost change of the link L2 in the section T22, a road corresponding to the link L2 is tracked in both the upbound and downbound directions until the road reaches intersections and sections including that road are determined as the influence range. Regarding the history information 900 as compared with the history information 900 according to the first embodiment as illustrated in FIG. 18, they are the same except that the history link 902 has not changed.

As a result of the processing explained above with reference to FIG. 20 to FIG. 24, the history information 900 is modified to the values indicated in FIG. 24. The navigation unit 110 can present a route as indicated in the operations illustrated in FIG. 22 by referring to the history information 900 illustrated in FIG. 24. Incidentally, in the operation example illustrated in FIG. 22, the reason why the route is presented as indicated in the screen 1038 is because the reference to the first row of the history information 900 illustrated in FIG. 24 is withheld; and the reason why the route is presented as indicated in the screen 1039 is because the reference to the second row of the history information 900 illustrated in FIG. 24 is withheld.

The following operational advantages can be obtained according to the above-described second embodiment.

(9) The influence range distribution system Sa includes the influence range distribution server 500 and the history information storage apparatus 400. The influence range distribution server 500 includes: the storage unit 202 that stores the first map data 600 and the third map data 800 which are divided into sections; the change detection unit 520 that detects a change of the first map data 600 and the third map data 800; the influence range determination unit 530 that determines a section influenced by the change; and the communication unit 206 that transmits the section determined by the influence range determination unit 530. The history information storage apparatus 400 includes: the storage unit 102 that stores the history information 900; the influence range receiving unit 170 that receives the section determined by the influence range determination unit 530; the history information control unit 150 that temporarily invalidates the history information 900 based on the information received by the influence range receiving unit 170; and the navigation unit 110 that calculates a route from a departure place to a destination in consideration of the history information 900 and records, in the history information 900, a history of a travel of the vehicle which has strayed from the route. Therefore, the operational advantages similar to those of the first embodiment can be obtained by dividing roles to the influence range distribution server 500 and the history information storage apparatus 400.

The above-explained respective embodiments and variations can be combined with each other. The various embodiments and variations have been explained above; however, the present invention is not limited to the content of these examples. Other aspects which can be thought of within the scope of the technical idea of the present invention are also included within the scope of the present invention.

The disclosure of the following priority basic application is hereby incorporated by reference.

Japanese Patent Application No. 2018-30771 (filed on Feb. 23, 2018)

REFERENCE SIGNS LIST

S, Sa: map update system
100, 400: history information storage apparatus
101: control unit
102: storage unit
103: display unit
110: navigation unit
120: map data update unit
130: change detection unit
140: influence range determination unit
150: history information control unit
160: history information update unit
170: influence range receiving unit
500: influence range distribution server
510: entire data comparison unit
520: change detection unit
530: influence range determination unit
600: first map data
700: second map data
800: third map data

The invention claimed is:

1. A travel history information apparatus for a vehicle comprising:
   a storage device that stores a data structure including history information about a travel history of the vehicle and a map data structure divided into a plurality of map sections;

a change detection circuit that detects a change of the map data structure by comparing a current map data structure with an updated map data structure stored in the memory device;

an influence range determination circuit that determines a map section influenced by the change of the map data structure, as an influenced map section from the plurality of map sections stored in the memory device;

a history information control circuit that temporarily invalidates the history information about the influenced map section; and a navigation circuit that calculates a route from a departure place to a destination place in consideration of the history information, and stores, in the history information data structure in the storage device, a history of a travel of the vehicle which has strayed from the route, wherein the navigation circuit stores, in the history information data structure, a travel portion of a travel route of the vehicle which has strayed from the route; and wherein the history information control circuit: temporarily invalidates a stored record related to a travel portion included in the influenced map section in the history information by setting a specified time limit; deletes the record from the history information when the vehicle does not travel along the travel portion included in the influenced map section by straying from the route by the specified time limit; and cancels invalidation of the stored record when the vehicle travels along the travel portion included in the influenced map section by straying from the route by the specified time limit.

2. The history information storage apparatus according to claim 1, wherein the navigation circuit stores, in the history information, a travel portion to the travel of the vehicle which has strayed from the route; wherein a road type of each travel portion is stored in the map data structure; and wherein the history information control circuit invalidates the history information which is included in the influenced map section and regarding which the road type of the travel portion is a specified type.

3. The history information storage apparatus according to claim 1, further comprising:

a communication circuit that receives second map data structure which is information for updating the map data structure; and a map data update circuit that updates the map data structure by using the second map data structure, wherein the change detection circuit detects the change by comparing the map data structure before an update by the map data update circuit with the map data structure after the update by the map data update circuit.

4. The history information storage apparatus according to claim 3, wherein the change of the map data structure includes new building of a road; and wherein the influence range determination circuit determines a map section where the newly built road which is the change exists as the influenced map section.

5. The history information storage apparatus according to claim 3, wherein the change of the map data structure includes a change of the road type; and wherein the influence range determination circuit determines a map section where the road with the change which is the change of the road type exists as the influenced map section.

6. The history information storage apparatus according to claim 3, wherein the influence range determination circuit determines a map section where an alternative route for the road in which the change has been detected exists as the influenced map section.

7. The history information storage apparatus according to claim 3, wherein the navigation circuit stores, in the history information, a travel portion of a travel of the vehicle which has strayed from the route; and wherein the history information storage apparatus further comprises a history information update circuit that rewrites the history information relating to the travel portion included in the influenced map section in accordance with the second map data structure.

8. A travel route calculation method for a vehicle executed by one or more processors including a storage circuit storing history information about a travel history of a vehicle and map data divided into a plurality of map sections, the method comprising:

detecting a change of the map data;

determining a map section influenced by the change as an influenced map section from the plurality of map sections;

temporarily invalidating the history information about the influenced map section;

calculating a route from a departure place to a destination in consideration of the history information and storing, in the history information, a history of a travel of the vehicle which has strayed from the route;

storing, in the history information data structure, a travel portion of a travel route of the vehicle which has strayed from the route; and invalidating temporarily a stored record related to a travel portion included in the influenced map section in the history information by setting a specified time limit;

deleting the record from the history information when the vehicle does not travel along the travel portion included in the influenced map section by straying from the route by the specified time limit; and canceling invalidation of the stored record when the vehicle travels along the travel portion included in the influenced map section by straying from the route by the specified time limit.

9. A travel route calculation system for a vehicle comprising a server and an in-vehicle apparatus that communicates with the server and is mounted in a vehicle, wherein the server includes: a server storage device that stores map data divided into a plurality of map sections;

a change detection circuit that detects a change of the map data;

an influence range determination circuit that determines a map section influenced by the change as an influenced map section from the plurality of map sections; and a server communication circuit that transmits information of the influenced map section determined by the influence range determination circuit; and wherein the in-vehicle apparatus includes;

a storage circuit that stores history information about a travel history of the vehicle;

an influence range circuit that receives the information of the influenced map section determined by the influence range determination circuit;

a history information control circuit that temporarily invalidates the history information about the influenced map section;

a navigation circuit that calculates a route from a departure place to a destination in consideration of the history information and stores, in the history information, a history of a travel of the vehicle which has strayed from the route;

wherein the navigation circuit stores, in the history information data structure, a travel portion of a travel route of the vehicle which has strayed from the route; and wherein the history information control circuit: temporarily invalidates a stored record related to a travel portion included in the influenced map section in the history information by setting a specified time limit; deletes the record from the history information when the vehicle does not travel along the travel portion included in the influenced map section by straying from the route by the specified time limit; and cancels invalidation of the stored record when the vehicle travels along the travel portion included in the influenced map section by straying from the route by the specified time limit.

* * * * *